United States Patent
Epstein et al.

(10) Patent No.: US 9,802,502 B2
(45) Date of Patent: *Oct. 31, 2017

(54) METHOD AND SYSTEM FOR CREATING A RESERVE ENERGY BANKING AND ENERGY RESERVE NETWORK

(71) Applicant: Lightening Energy, Dover, NJ (US)

(72) Inventors: Michael L. Epstein, Bedminster, NJ (US); Christopher K. Dyer, Madison, NJ (US); Duncan Culver, Howell, NJ (US)

(73) Assignee: Lightening Energy, Dover, NJ (US)

( * ) Notice: Subject to any disclaimer, the term of this patent is extended or adjusted under 35 U.S.C. 154(b) by 1014 days.

This patent is subject to a terminal disclaimer.

(21) Appl. No.: 14/087,704

(22) Filed: Nov. 22, 2013

(65) Prior Publication Data

US 2014/0148965 A1 May 29, 2014

Related U.S. Application Data

(60) Provisional application No. 61/729,841, filed on Nov. 26, 2012.

(51) Int. Cl.
*B60L 11/18* (2006.01)

(52) U.S. Cl.
CPC ........ *B60L 11/1842* (2013.01); *B60L 11/1816* (2013.01); *B60L 11/1825* (2013.01); *B60L 11/1846* (2013.01); *B60L 11/1848* (2013.01); *B60L 11/1874* (2013.01); *B60L 2230/12* (2013.01); *B60L 2230/16* (2013.01); *B60L 2230/22* (2013.01); *B60L 2230/28* (2013.01); *B60L 2230/30* (2013.01); *B60L 2240/545* (2013.01); *B60L 2250/16* (2013.01); *B60L 2250/20* (2013.01); *Y02E 60/721* (2013.01); *Y02T 10/7005* (2013.01); *Y02T 10/705* (2013.01); *Y02T 10/7088* (2013.01);
(Continued)

(58) Field of Classification Search
CPC combination set(s) only.
See application file for complete search history.

(56) References Cited

U.S. PATENT DOCUMENTS

| 8,498,886 B2 | 7/2013 | Epstein et al. |
| 8,914,260 B2 * | 12/2014 | Epstein ............... B60L 11/1824 703/1 |

(Continued)

OTHER PUBLICATIONS

Andersen, Poul H., John A. Mathews, and Morten Rask. "Integrating private transport into renewable energy policy: The strategy of creating intelligent recharging grids for electric vehicles." Energy Policy 37, No. 7 (2009): 2481-2486.*

*Primary Examiner* — Aniss Chad
(74) *Attorney, Agent, or Firm* — Davidson, Davidson & Kappel, LLC

(57) ABSTRACT

A method for creating a collective energy reserve network is provided. The method includes receiving first data including location data and first energy reserve interest data from a first remote device; receiving second data including location data and second energy reserve interest data from a second remote device; and using the first location data, first energy reserve interest data, second location data and second energy reserve interest data to permit creation of a first collective energy reserve. The energy reserve may be free standing or integrated with an electric vehicle recharger.

14 Claims, 18 Drawing Sheets

(52) U.S. Cl.
CPC ............ *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | |
|---|---|---|---|
| 2008/0040263 A1* | 2/2008 | Pollack | G06Q 20/10 705/39 |
| 2010/0211643 A1* | 8/2010 | Lowenthal | B60L 3/0069 709/206 |
| 2010/0241560 A1* | 9/2010 | Landau-Holdsworth | B60L 3/0069 705/39 |
| 2012/0173292 A1* | 7/2012 | Solomon | G06Q 50/30 705/5 |
| 2012/0221299 A1 | 8/2012 | Epstein et al. | |

\* cited by examiner

| Energy Storage Station at the Corner of 32 & 299 |

ID# : 725 ←/22

Energy Type : Batteries ←/24

Location : Parking Lot ←/26
Mountain Brauhaus
123 Route 44
New Paltz 12561

Participants : 6 ←/30

Cost/Participant : $1500.00 ←/32

Current Participants : abc 123 ←/34

| Participate | ←/36

| Energy Storage Station at the Corner of 32 & 299 |

ID# :   663 ← 222

Type :   Batteries & ← 224
         Gasoline

Location :   Texaco ← 226
             536 Main St.
             New Paltz 12561

Participants :   6 ← 230

Cost/Participant :   $1200.00 ← 232

Current Participants :   xyz 123 ← 234
                         ddk 100
                         joey 7

[ Participate ] ← 236

FIG. 4

| Energy Storage Station at the Corner of 87 & 299 |

ID# :   212   — 322

Type :   TBD   — 324

Location :   Town New Paltz Parking Lot — 326
Corner Main St. /87 Exit
New Paltz 12561

Participants :   TBD   — 330

Cost/Participant :   est Total Cost $8000   — 332

Interested :   xzy 222   — 334
john 637

[ Express Interest ]   — 336
[ Become Founder ]   — 338

☒ Interest in Creating an Electric Vehicle Recharging Station

Reserve Energy Purpose

Vehicle Energy

☐ Gasoline

☐ Diesel

☐ Natural Gas

☒ Electric Recharging

☐ Multi

Containerized Energy

☐ Gasoline

☐ Propane

☐ Natural Gas

☐ Portable UPS Batteries

☐ Other

Energy Storage at Long Island Recharge Stations

ID #: 925-A

Model, Make and Year of EV: Nissan, Leaf, 2012

Location 1: Babylon

Location 2: Brentwood/Haupague

Location 1 at Time 1: L1,T1 { Day or Date: Monday; Between: Midnight and 3 AM

Location 1 at Time 2: L1,T2 { Day or Date: Wednesday; Between: 3 PM and 6 PM

Location 2 at Time 3: L2,T3 { Day or Date: Saturday; Between: noon and 3 PM

Fig. 16

Availability of HIGH RATE (RAPID) RECHARGING with and without Energy Storage Stations

CAUTION: THE US DEPARTMENT OF ENERGY ADVISES THAT LONG ISLAND GRID CONDITIONS CANNOT SUPPORT WIDE-SPREAD HIGH-RATE (RAPID) RECHARGING, ESPECIALLY DURING PEAK LOADS.

SELECT YOUR PARTICIPATION FOR THE WEEK

| | | Recharger Without Storage | Recharger With Energy Storage Station |
|---|---|---|---|
| Babylon | L1, T1: | [X] High rate available | [ ] High Rate Available |
| | L1, T2: | [ ] High rate NOT available | [X] High Rate Available |
| Brentwood/ Haupague | L2, T3: | [ ] High Rate NOT Available | [X] High Rate Available |

Fig. 17a

| # Participants for Energy Storage Station/ Rapid Recharge: | 20 |
|---|---|
| Minimum Contract Duration per Participant: | 5,000 miles/1 year (min 1000 kw hrs.) |
| Minimum Cost per Participant: | $ 80 per month |

[PARTICIPATE] [UPDATE]

Fig. 17b

METHOD AND SYSTEM FOR CREATING A RESERVE ENERGY BANKING AND ENERGY RESERVE NETWORK

This claims the benefit to U.S. Provisional Patent Application No. 61/729,841, filed Nov. 26, 2012, which is hereby incorporation by reference herein.

BACKGROUND

During times of emergency such as natural disaster or war, the interruption of power and energy supply can create a cascade of devastating consequences for individuals and society as a whole. Due to the Autumn 2012 landfall of Hurricane Sandy, the consequences of partial energy supply disruption have been experienced by residents in the Tri State region of New York, New Jersey, Connecticut and as far inland as Cleveland Ohio and beyond. The cascade of consequences, due to the energy disruption included wide spread electrical outages, disruption of gasoline supply, disruption of telecommunications, and other issues including disruption of some of primary hospitals, widespread personal hardship, security risks and wide spread economic loss.

SUMMARY OF THE INVENTION

Individuals have limited choices for risk mitigation when concerned about disruption of established energy supplies like gasoline distribution, electricity from the grid, natural gas pipelines and beyond. Even those who have means and location for investing in home electrical generators can face disruption when fuel supplies become disrupted.

Large scale users like government organizations and global corporations frequently have domain expertise and use stockpiling and redundant lines of backup to mitigate acute energy risks. In comparison, however, individual users typically lack the wherewithal to build energy resiliency and risks mitigation strategies on their own.

Additionally, for an electric vehicle driver, the lack of timely recharging can be entirely disruptive. It is neither practical nor feasible for electric vehicle drivers to install personal reserve/backup energy stations along their individual routes of travel. For electric vehicles, even a drop in voltage or output from the grid can create recharging issues Nor is it safe or practical for most individual to maintain large stores of gasoline at their homes or apartments. The status quo for many decades is that individual user are simply vulnerable to disruption at certain peak times, seasons, temperatures, storms, peak demand periods, natural disasters or beyond.

Unlike big organizations, the individual end-users lack economies of scale, domain knowledge, and expertise to mitigate risks with a broad range of choices on their own. Keeping a substantial stockpile or reserved energy bank requires land, labor, capital, technological knowledge, environmental management, zoning restrictions, delivery and maintenance issues and other considerations that are not easily accessible on an individual.

The present invention may solve these issues by providing individual users a method and system for creating a reserve energy banking and energy reserve network.

The present invention provides a method for creating a collective energy reserve network comprising:
receiving first data including location data and first energy reserve interest data from a first remote device;
receiving second data including location data and second energy reserve interest data from a second remote device; and
using the first location data, first energy reserve interest data, second location data and second energy reserve interest data to permit creation of a first collective energy reserve.

The present invention also provides a method for creating a collective energy reserve network comprising:
receiving first location data from a first remote device;
providing possible location data for a first collective energy reserve as a function of the first location data;
receiving first interest data from the first remote device in the first collective energy reserve; and
providing the first interest data to a second remote device to generate further interest data in the first collective energy reserve.

The present invention also provides a method for creating a collective energy reserve network comprising:
receiving first location data from a first remote device;
providing collective energy reserve data to the first remote device as a function of the first location data;
in response to the collective energy reserve data, receiving data from the first remote device indicating interest in creating a first collective energy reserve so as to define the first interest data;
providing the first interest data to a second remote device; and
in response to the first interest data, receiving second location data including actual location data for a first collective energy reserve.

The present invention also provides a computerized system for creating a collective energy reserve network comprising:
a server; and
a plurality of remote devices capable of communicating with the server, including a first remote device and a second remote device;
the server including first location data from the first remote device, collective energy reserve data, second location data from the second remote device, interest data from the first and second remote devices, and first collective energy reserve data, the first collective energy reserve data being a function of the interest data.

The present invention also provides a computerized system for creating a collective energy reserve network comprising:
a server; and
a plurality of remote devices capable of communicating with the server, including a first remote device and a second remote device;
the server including first location data from the first remote device, possible location data for a first collective energy reserve first location data, first interest data from the first remote device in the first collective energy reserve, and further interest data from the second remote device in the first collective energy reserve.

The present invention also provides a computerized system for creating a collective energy reserve network comprising:
a server; and
a plurality of remote devices capable of communicating with the server, including a first remote device and a second remote device;
the server including first location data from the first remote device, first interest data from the first remote device, second location data from the second remote device as a function of the first interest data, the second location data including actual location data for a first collective energy reserve.

The present invention also provides a collective energy reserve network created by one of the above methods or systems.

A method for creating a collective energy reserve and electric vehicle recharging network is also provided. The method includes receiving first location data from a first remote device; providing, by at least one server, energy data to the first remote device as a function of the first location data, the energy data relating to an energy reserve not yet existing and an electric vehicle recharging station not yet existing; in response to the energy reserve data, receiving interest data from the first remote device to permit creation of at least one of the energy reserve and the electric vehicle recharging station, the interest data including information regarding participation in creating the energy reserve and the electric vehicle recharging station; and creating at least one of the energy reserve and the electric vehicle recharging station as a function of the interest data, the creating the at least one of the energy reserve and the electric vehicle recharging station as a function of the interest data including determining, by the at least one server, a level of participation in creating the at least one of the energy reserve and the electric vehicle recharging station from the interest data and creating the at least one of the energy reserve and the electric vehicle recharging station when the interest data received by the at least one server indicates the level of participation reaches a predetermined threshold.

A computer system for creating an alternative energy vehicle supply station network is also provided. The computer system includes a computer readable memory storing program instructions and a processor to execute the program instructions via the computer readable memory. The program instructions generate a graphical user interface displaying representations of a plurality of potential collective energy reserves and, responsive to user selection of at least one representation of the potential collective energy reserves on the graphical user interface, generate a graphical user interface for receiving interest data including user commitments for the selected at least one representation of the potential collective energy reserves. The program instructions compile the interest data in the computer readable memory and output commitment results when the interest data received by the at least one server indicates the level of user commitments reaches a predetermined threshold.

BRIEF DESCRIPTION OF THE DRAWINGS

One embodiment of the method and system of the present invention may be further described using the following drawings, in which:

FIG. 3 shows the first GUI of the first remote device with data concerning possible energy storage station of FIG. 2;

FIG. 4 shows the first GUI of the first remote device with data concerning possible energy storage station of FIG. 2;

FIG. 12 shows one exemplary embodiment of a rechargeable charging battery that may be used in the battery bank;

FIG. 14 shows an embodiment of a graphical user interface of the present invention;

FIG. 16 shows an embodiment of a graphical user interface of the present invention;

FIG. 17a show an embodiment of a graphical user interface of the present invention for allowing a user to provide further user preferences for rate of recharge and time of recharge usage for a given location; and FIG. 17b shows an embodiment of a graphical user interface of the present invention providing a user with feedback on cost.

DETAILED DESCRIPTION OF THE PREFERRED EMBODIMENT

Figure 1:
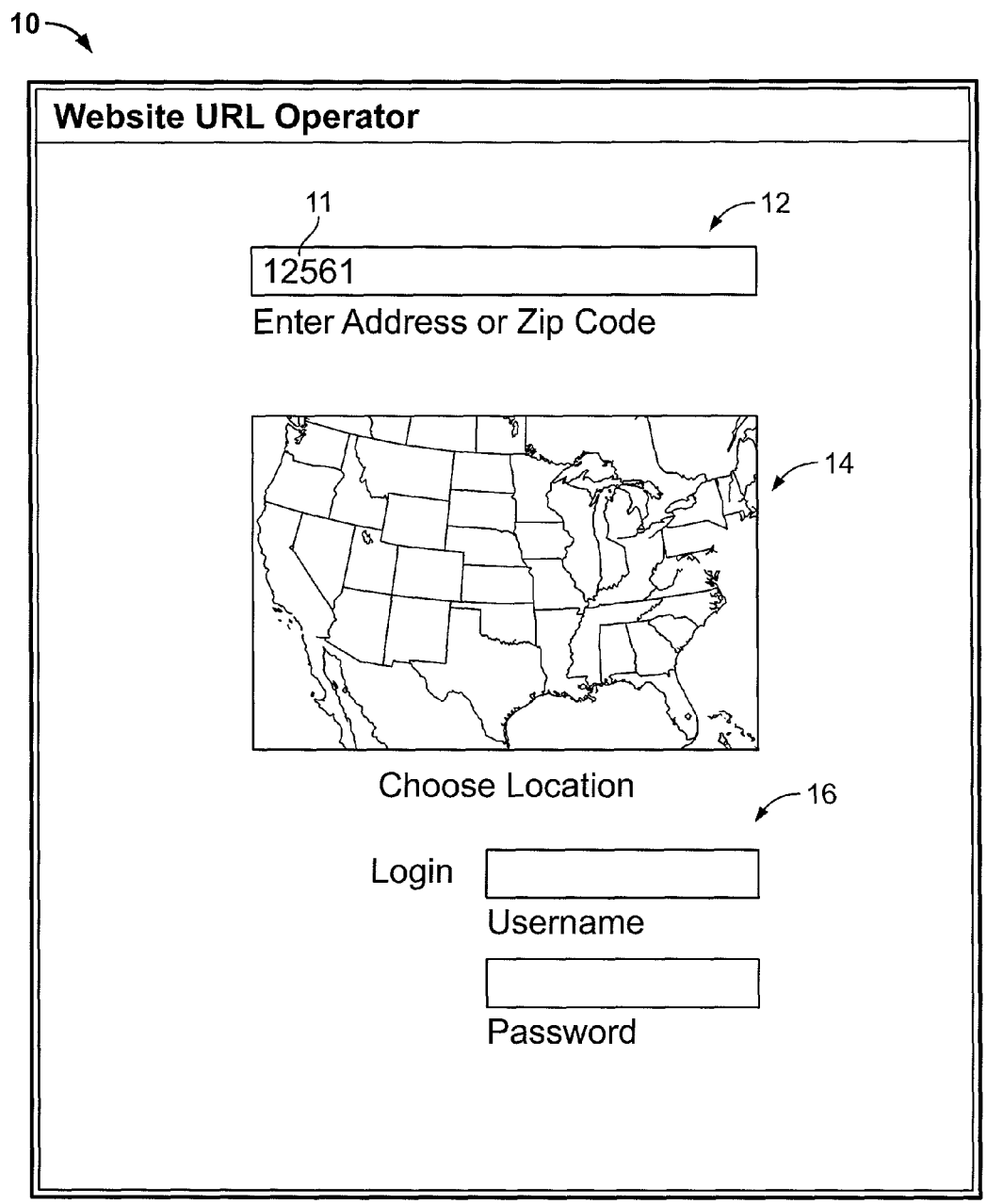
FIG. 1 shows a first GUI of a first remote device with a web page for receiving first location data.

Embodiments of the present invention may enable potential users to acquire and maintain rights to power and energy reserves through a collective energy reserve that would be available to them in the event of emergency or disruption or as an expedient for the user's needs. Online systems and databases may be provided for users that are accessed through online user interfaces used for online transactions and networking. An online or mobile user interface may be provided through which each user may input a profile. The user profiles may be recorded in a central database system, through which the user profiles are sorted by data query to match each user with existing storage reserve capacity that can be assigned to the user based upon an online offering and an online transaction. When an existing storage reserve capacity is not available or desirable to the user, then the online or mobile interface may be permitted to interact with an electronic database management system. The electronic database management system facilitates users using an electronic social network to form groups for creating and financing new reserves and establishing electronically managed accounts through which each user may assume certain obligations in exchange for receiving rights to a specific quantity or ownership right in specific energy reserves. The obligations may be in the form of user fees for establishing and maintaining a user assigned reserve for a determined quantity or share of energy at a specific site, area or region. The collective energy reserves can be co-founded or initiated by the users on a ground up basis entirely predicated on the users' perception of need.

In the event of a natural disaster or other unexpected instances leading to a loss of power and/or energy supplies, such as for example cyber warfare disabling power and energy infrastructure, people in an affected region may be forced to suffer in the cold without heat or electric or may have difficulty trying to find fuel. This may cause people such as first responders, restoration workers, physicians, nurses, electricians and carpenters to be delayed in carrying out their duties due to scarcity of transportation fuel.

Embodiments of the present invention allow groups of individuals working together to maintain a collective energy reserve as a common bank of emergency backup power and energy from which they hold an interest and defined rights. Such an asset may provide a nearby location from which individuals may draw reserves at time of disaster or hardship. Hardship may include insufficiency of an electric grid to support rapid recharging of an electric vehicle. Hardship may also include exposure to peak pricing or price gouging at the time of energy need. In order to ensure availability, such a bank may be localized for ready access in conjunction with or independent from an electric vehicle recharger. In order to further distribute the risks away from a point, location or region; however, it may be desirable to involve a broader network of sites and users wherein other localized reserve assets may be used cooperatively and collaboratively and become transferable during times of need. Such a broader network of reserve assets may mitigate problems caused by the inability of any single site or region of sites to provide the energy needs of the users by allowing users to borrow from other affiliated sites. For example, resources from a continuum of sites also may be used like a fire brigade, especially during worst case scenarios, to help support availability of emergency energy reserves. Privately owned and proprietary energy assets available in one location may also be shuttled to an adjacent area.

Natural disasters are generally confined to effected regions rather that distributed everywhere at the same time. A network of coordinated local sites therefore may help provide a buffer for the users against the risks of loss for any single site. Casualty insurance operates under the principal that financial risks of loss can be distributed across a broader insurance underwriting group, in order to mitigate losses of individual members of the group that suffer harm. A private and proprietary holder of energy reserve assets, by joining into the network rather than going alone, could therefore gain broader risk coverage by sharing access to assets of other reserves of affiliated members and participants.

Based upon the foregoing observations, embodiments of the present invention provide a computer server network or mobile network to implement social networking through which each interested participant can register his or her interest in participating in a collective energy reserve, which may be for example a private/proprietary energy storage location or an energy storage bank or in conjunction with an electric vehicle recharger. In one embodiment participation in the collective energy reserve would be enabled by an online system and network of individual users. Each user fills out an online survey expressing his or her interest in becoming a member of the collective energy reserve. The survey may include pertinent information such as the potential member's identity, location, energy preferences, and financial bona fide qualifications to participate. This information is used to screen and match potential members who share a common geographical proximity and a complementary interest in holding a specific type of energy right. The energy right of the collective energy reserve may be in the form of a right to future energy quantity at a time of need, a shared ownership in an energy storage station and rights to defined unit of stored energy, or a title to a specific unit of stored energy, or other means to equate a measure for the rights of each the participant.

For an electric vehicle user this invention may provide, for example, the right to charge their vehicle from an energy reserve in the form of a battery bank at a given time and date for purposes of achieving a rapid recharge (e.g., at a time, location or fee structure where the grid is not otherwise directly compatible with a rapid recharge). According to the U.S. Department of Energy, Long Island is one of many regions where the existing electric grid is not sufficiently robust to support broad access to high rate recharging. Since peak demand is sometime managed on Long Island through brown outs (voltage and output reductions) these supply management techniques also will creates hardship for EV drivers seeking to recharge in the future. Through embodiments of the present invention, instead, users may be enabled to organize a collective energy reserve to support recharging times and rates that may vary from grid availability.

In essence, ownership in a collective energy reserve may represent a right to hold energy in reserve for retrieval at a predetermined site or region. The right may be similar to a bank deposit with a safety deposit box, in the form of physical asset at an actual physical storage container at a specific physical location. In other embodiments, an ownership interest in a collective energy reserve may be in another form similar to a bank account deposit providing guaranty such as a "future" that provides a right of delivery or retrieval through prescribed logistics. The prescribed logistics may include arrival of a reserved amount of energy by transportation or distribution means to a predetermined site or area that fulfills users' rights to access a reserved quantity and form of energy at a time period and area of need. The prescribed logistics may include a legal instrument that provides the bearer with special rights and priorities at a prior established energy storage facility. An asset of a collective energy reserve may include a storage tank of gasoline at a physical location, or predetermined conditions for siting a shipping container, a rail car, an express truck, or other means to provide a holder with the ability to execute rights for reserving a predetermined supply of energy for access at a time period and area of need at an assured area for access.

Presently, such an energy reserve asset is not readily available to the users such as individuals, small entities, and other organizations. Embodiments of the invention provide a method and system for the ground-up creation of a collective energy reserve, for personal, small entity and others' power and energy storage.

Embodiments of the invention may also enable deployment of energy generating and storage capability at time of emergency need. For example, an energy pod (shipping container with banks of batteries and pop-up solar and wind collection for possible easy grid connection) may be distributed as an energy source.

Embodiments of the invention also may include management system models and real time data inputs into the models as a function of predicting the likely duration of an energy emergency. Prediction of the duration of an active energy emergency may also enable limitations of user rights to the collective energy reserve for example for the number of usages, time of usage, or quantity of usage as a function of the predicted duration of the energy emergency.

Because of long cycle life of rechargeable lithium ion batteries, modules of batteries may also be managed by an operator of the systems. The modules of batteries may be used for daily cash flow (discharge (sell) into the grid during day, recharge at low cost off the grid at night) by the operator when not needed for emergency use. The modules of batteries may be transported and deployed to a group of contract holders at a time of need. Actuarial approach may be taken on maintaining sufficient numbers of units at a full state of charge or partial state of charge for usage during power loss occurrence.

FIG. 1 shows a first graphical user interface (GUI) of a first remote device with a web page 10 for receiving first location data 11. The first remote device may be any device capable of interacting as a client with a server, for example a home computer, cell phone with web capabilities, or tablet, connected for example via a TCP/IP protocol to a server. The first remote device may have voice capabilities as well for providing or receiving any of the information herein.

Web page 10 permits a user of the first remote device to enter first location data 11, for example via an address or zip code field 12, a map 14 permitting receipt of for example a mouse pointer information, or via a log-in field 16 where the users location information is already known, for example via a database.

Figure 2:
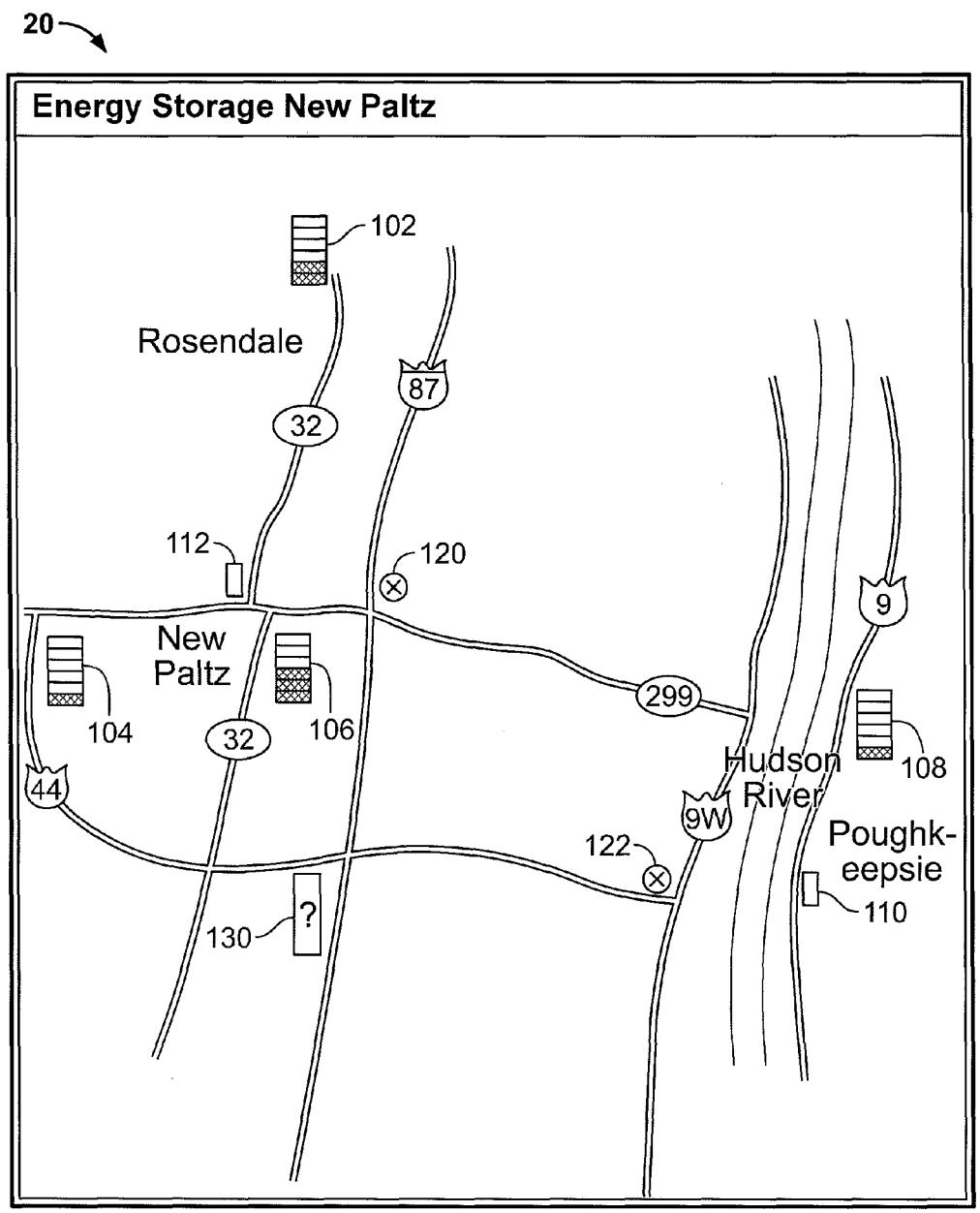
FIG. 2 shows the first GUI of the first remote device with a web page providing data on various existing and possible energy storage stations.

The first location data 11, here a zip code, can be received at a server providing web page 10, and in response to the first location data 11 the server can provide data concerning an existing or envisioned network of collective energy reserves via for example a web page 20, as shown in FIG. 2.

The data in FIG. 2 may include a map indicating collective energy reserves, which are in this embodiment for example completed energy storage stations 110, 112, possible energy storage stations 102, 104, 106, 108 with interest data including payment data and actual location data concerning the stations already received and stored by the server, possible energy storage stations 120, 122 with actual location data concerning the stations stored by the server, but no payment data yet received, and possible energy storage station 130 with interest data but not actual location data yet received. In this embodiment, energy storage stations 102, 104, 106, 108, 110, 112, 120, 122 are physical facilities that store actual energy reserves. In other preferred embodiments, a location of the collective energy reserve may be where energy supplies are distributed to members of the collective energy reserve. These locations may be a specific location, such as a parking lot, or a general location, such as an entire town. If the location is general, the operator of the collective energy reserve may deliver the supplies to a specific location within the general location when requested by a user. The specific location may be pickup location for a plurality of users, such as a parking lot, or may be a user's address.

FIG. 2 thus represents an overview of an existing and possible collective energy reserve network in which members of a social network or simply those accessing a website may be provided not only with information regarding existing energy storage stations 110, 112 in the network, but also in one embodiment on becoming participants by making a commitment in building up the network, for example by investing and providing payment data for shares in possible energy storage stations 102, 104, 106 and 108. In yet further embodiments of the present invention the method and system of the present invention permit landowners and others to provide actual location data, for example so that possible energy storage stations 120, 122 are created, and in yet another embodiment for users simply to express certain partial interest in creating an energy storage station 130 in a certain general location.

An entire collective energy reserve network, such as a distributed emergency energy bank, can be created from the bottom up based on actual needs and desires of the participants of the network.

The creation of the network will now be described in greater detail.

FIG. 3 shows the first GUI of the first remote device with data concerning possible energy storage station 104 of FIG. 2. Upon for example, clicking by a user of the first remote device on the graphical representation of energy storage station 104, current data on the possible energy storage station 104 can be provided to the first remote device. The collective energy reserve data of station 104 may include network ID data 22, energy type data 24, location data 26, participant number data 30, cost data 32, current participant data 34 and a participate button 36.

For this possible station 104, solely one participant has provided payment data, and if the system is so designed, access to the participant, for example via email contact may be provided. In a preferred embodiment, access to the participant is only provided if the user of the first remote device and the participant are members of a social network, for example the social network running the server.

By selecting participate button 36, a user may make a commitment to creating the corresponding collective energy reserve. The commitment may include an investment or other commitment regarding creating a collective energy reserve in the form of station 104. A user may enter bank information to submit the commitment to the operator of the server or may submit a payment through a third party e-commerce business, such as PAYPAL, according to terms generated by the server. The commitment may be in the form of an actual payment, in full or in a down payment with terms of a future payment or installments, or a binding contractual agreement. The binding contractual agreement may be unconditional, or it may be conditioned on commitments to invest in the selected potential station for which the user has tendered a commitment to reach a predetermined threshold. For example, if the costs for establishing or creating a potential energy storage station or other collective energy reserve are estimated to be $9 k, a user can agree to invest $1.5 k in the potential energy storage station or other collective energy reserve, with the investment being conditioned on the additional $7.5 k being committed by a set date.

In one embodiment, selecting participate button 36 prompts the server to generate further information regarding the level of commitments, by accessing further commitment data from the server's memory and displaying the further information to the user on a GUI. The further information may include investment information, such as details regarding ownership shares of one or more of the potential collective energy reserves. The investment information may also include a share price for selected potential collective energy reserve and a number of shares for each selected collective energy reserve. The share price and the number of shares may be determined by the number of potential users for the selected potential collective energy reserve and the total estimated cost of establishing the collective energy reserve such that, if all shares have been purchased, all total estimated costs of establishing the collective energy reserve are funded. Users may then make a commitment to purchase as many or as little shares for the selected potential collective energy reserves as desired. The information may also include energy cost and quantity information for selected potential collective energy reserve and a quantity of energy for each selected collective energy reserve. This information may also include additional parameters such as specific time or time period information for selected potential collected energy reserve. Since the reserve is not necessarily static and may potentially be replenished, for example, the share price or access rights may include restrictions such as time period or priority. Users may then make a commitment to purchase as many or as little shares for the selected potential collective energy reserves as desired, subject to restrictions for example for time of day, date, season, purpose, circumstance or priority ranking among other users. The users may also make a commitment to purchase a specific quantity of one or more specific kinds of energy reserves. For example, a user may commit to purchase five rechargeable batteries, which will be stored at a storage station for pickup or delivery at a time of need.

FIG. 3 thus provides the first remote device with data including actual location data and participant data, the participant having already provided interest and payment data to the server. The user of the first remote device thus can be assured that submission of payment data by a certain number of participants, here a total of six participants, will result in creation of the collective energy reserve, which in this embodiment is energy storage station 104. For example, the operator of the website will create all legal documents and purchasing documents and then forward legal conformation of the participation of the user in the energy storage station 104. The legal form may vary from state to state or location to location, but may be for example a partnership, time-share, LLC, Real Estate Investment Trust (REIT), Right to Delivery of Energy Futures, other contractual relationship or other legal form. In other embodiments, as noted above, payment may be delayed until later for example after formation of the energy storage station.

The server receives the commitment information submitted by the user and stores the commitment information with previous commitment information in a commitment record in the memory of the server. When commitments with respect to a collective energy reserve, for example station 104, reach a predetermined threshold, the operator of the server may begin creating or establishing the collective energy reserve. Creating or establishing the collective energy reserve may include purchasing and procuring the energy reserve and constructing a physical station for storage of the energy reserve. In the event that the energy reserve is needed by the users, for example to a natural disaster or other emergency, the operator of the server may provide the energy reserve to the users at station 104 or may deliver the energy reserve to the users at their homes or in another location.

The location, cost and other data may have been provided by a lead participant, by the network running the server, by the location owner, a third party or any combination.

FIG. 4 shows the first GUI of the first remote device with data 230 concerning possible energy storage station 106 of FIG. 2. The energy storage station data 230 may include network ID data 222, energy type data such as fuel or battery storage type data 224, location data 226, participant number data 230, cost data 232, current participant data 234 and a participate button 236. Here, three participants xyz123, ddk100 and joey 7 have provided payment already. Also here, three participants have each reserved batteries and gasoline for storage at energy storage station 106.

Map 20 in FIG. 2 can be updated with visual clues expressing actual participants, for example six bars on location 106 can be shown, with three filled, and one more filled as a further participant joins.

Map 20 in FIG. 2 further can be updated with visual clues expressing available types of energy for storage, for example icon for gasoline containers and batteries on location 106 can be shown, with other icons added as further types of supply are available such as alternative fuels, liquid natural gas, compressed natural gas and hydrogen.

Figure 5:
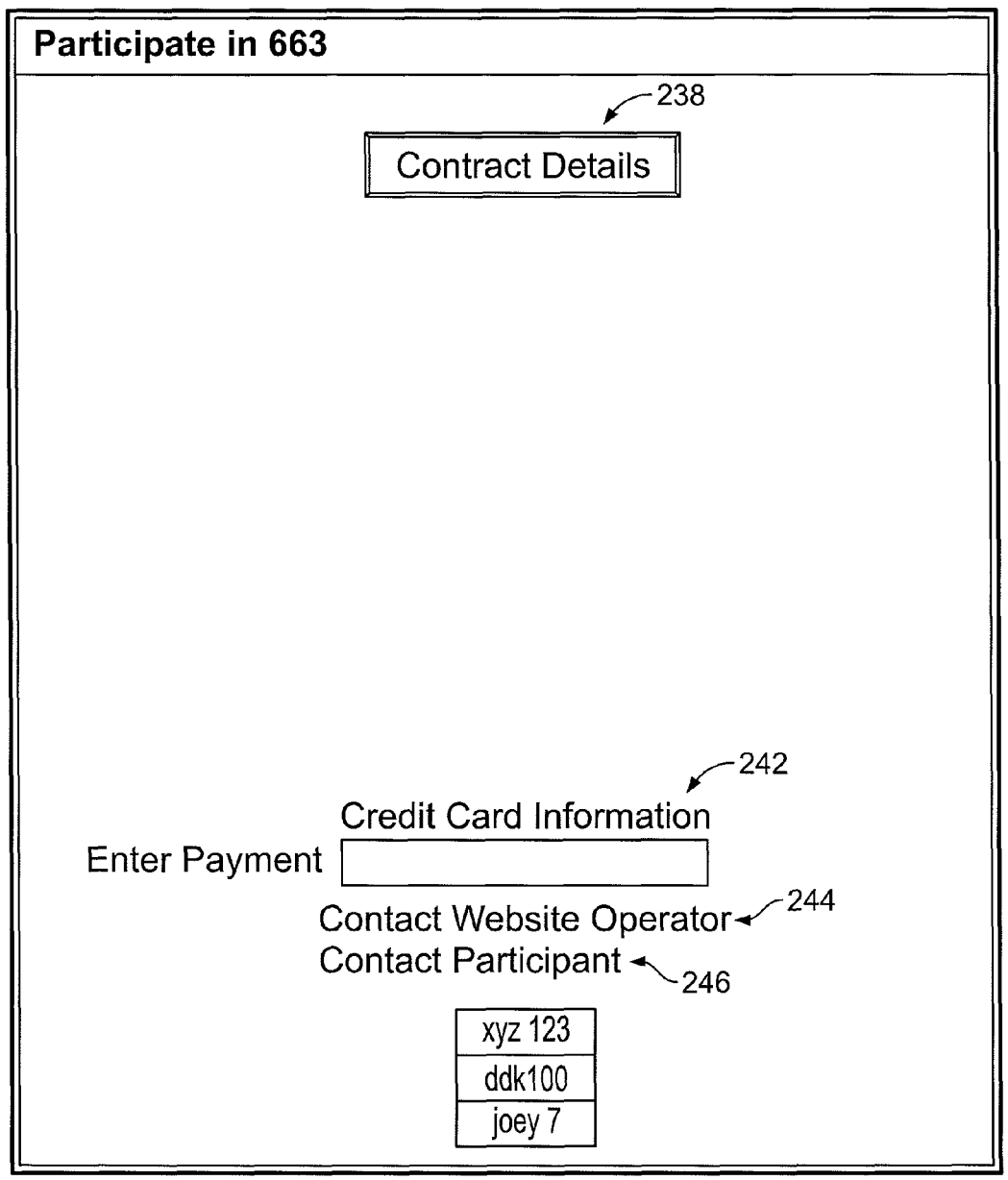
FIG. 5 shows the first GUI of the first remote device with a web page permitting input of data concerning possible participation in creating energy storage station of FIG. 2.

FIG. 5 shows the first GUI of the first remote device with a web page which may result upon clicking of the participate button 236. This web page permits input of data concerning possible participation in creating a storage station 106 of FIG. 2, and also provides for example for the user to receive contract details, for example via a button 238. Any legal documents to be signed or already signed, including for example land lease or energy future rights information and the basis for the cost information may be provided. These details advantageously also may be solely available to members of the social network mentioned above.

Payment information such as initial fees and recurring maintenance fees can be received for example via input 242, and may be cleared for example by the server and operator of the server.

The server operator can also be contacted via input 244, and other participants via input 246 for example.

Figure 6J:
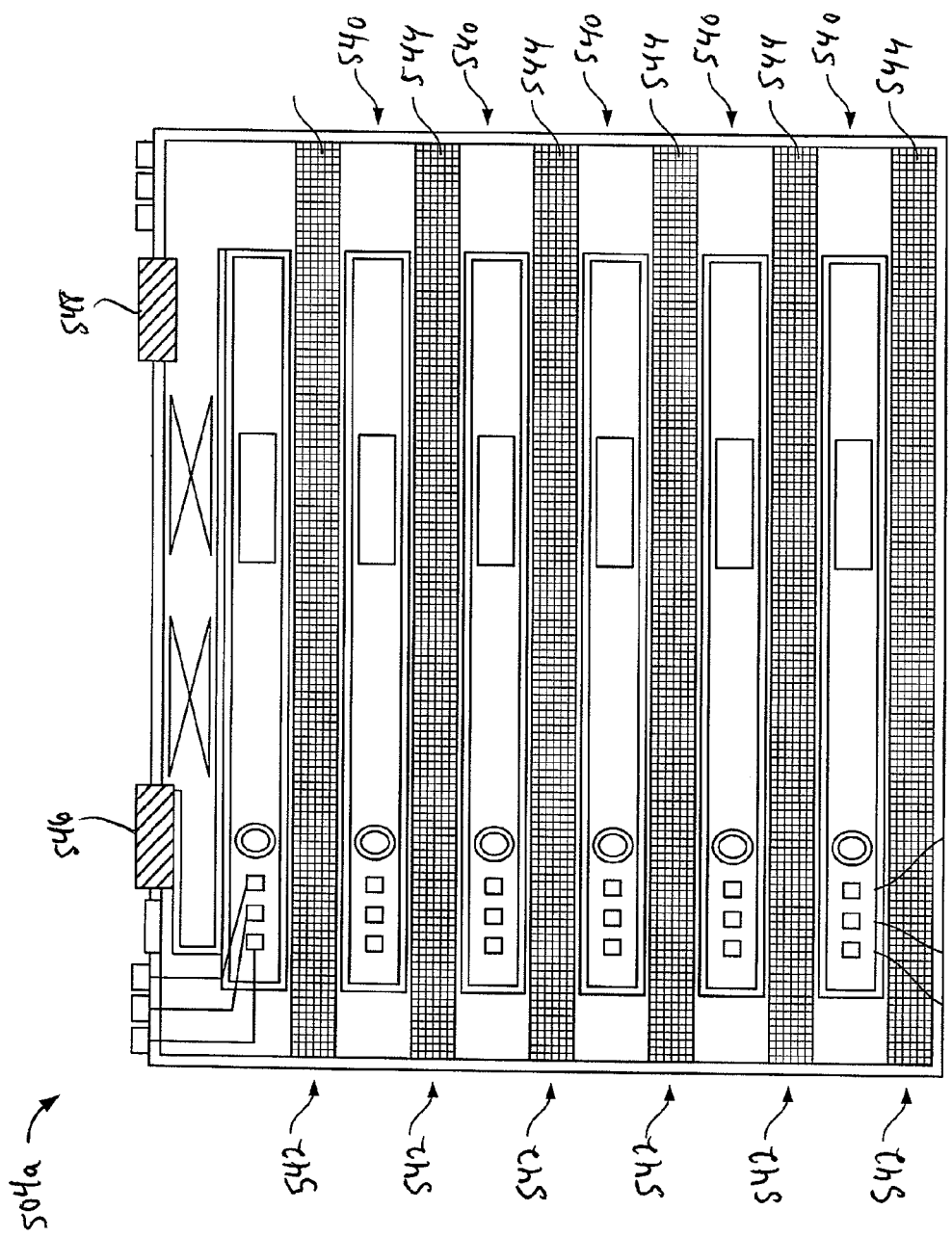
FIG. 6 shows a second GUI of a second remote device with data concerning the possible energy storage station of FIG. 2.

FIG. 6 shows a second GUI of a second remote device with data concerning the possible energy storage station 120 of FIG. 2. The collective energy reserve data may include network ID data 322, energy type data 324, location data 326, participant number data 330, cost data 332, interested participant data 334, an express interest button 336 and a become founder button 338. Here, two participants xyz22 and john637 have expressed interest but not taken any further steps. No actual payment has been received. The server operator has provided ID data 322 and estimated cost data 332, based for example on similar locations in the area. A possible lessor has provided actual location data 326. However, the type of energy, number of participants and total cost have not been decided.

In this embodiment, a potential participant could simply decide these fields as a founder, by pressing button 338. The operator or further web pages could direct the participant to provide payment and take further steps. In fact, the participant could decide to be the sole owner and have data field for participant number 330 to have the value one. More likely, the potential participant will make a partial investment.

Figure 7:
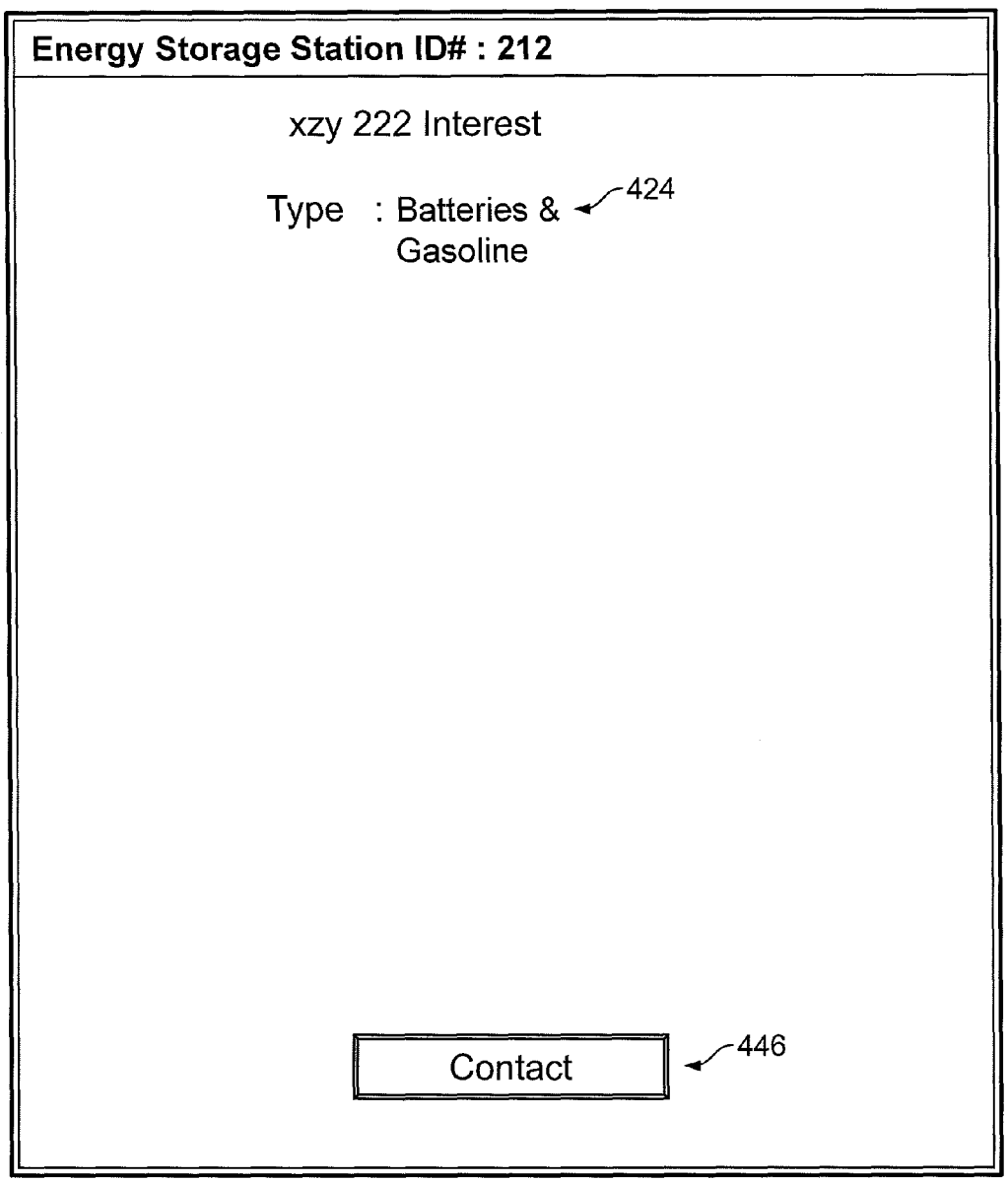
FIG. 7 shows the second GUI of the second remote device with a web page permitting input of data concerning possible participation in creating energy storage station of FIG. 2.

Alternately, the viewer of FIG. 6 could simply express interest via button 336 and be shown FIG. 7. Type interest via input 424 and quantity interest 426 could be provided to enable the operator to collect interest information on possible station 120. Data can be sent via a submission or contact button 446.

Figure 8:
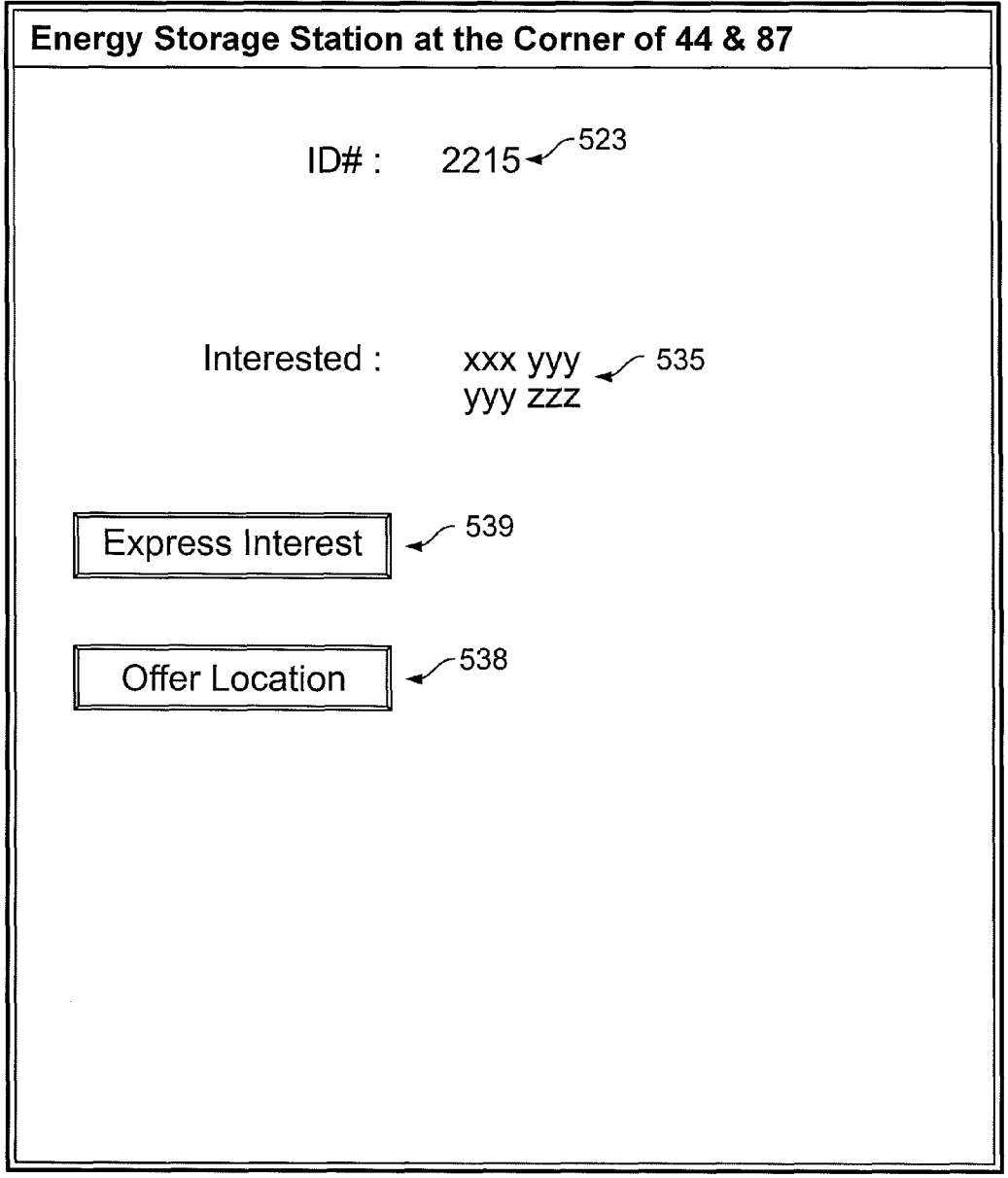
FIG. 8 shows a third GUI of a third remote device with data concerning the energy storage station of FIG. 2.

FIG. 8 shows a third GUI of a third remote device with data concerning the possible energy storage station 130 of FIG. 2. Here interest in the general area has been expressed by 2 parties, shown in field 535. A first party xxxyyy had expressed interest in the general location, for example via clicking a pointer on map 20, and the website operator provided a graphical indicator with a question mark as possible energy storage station 130, and an ID 522. A second party yyyzzz expressed similar interest via a button 536 and provided some data, for example via a web page similar to that shown in FIG. 7.

Figure 9:
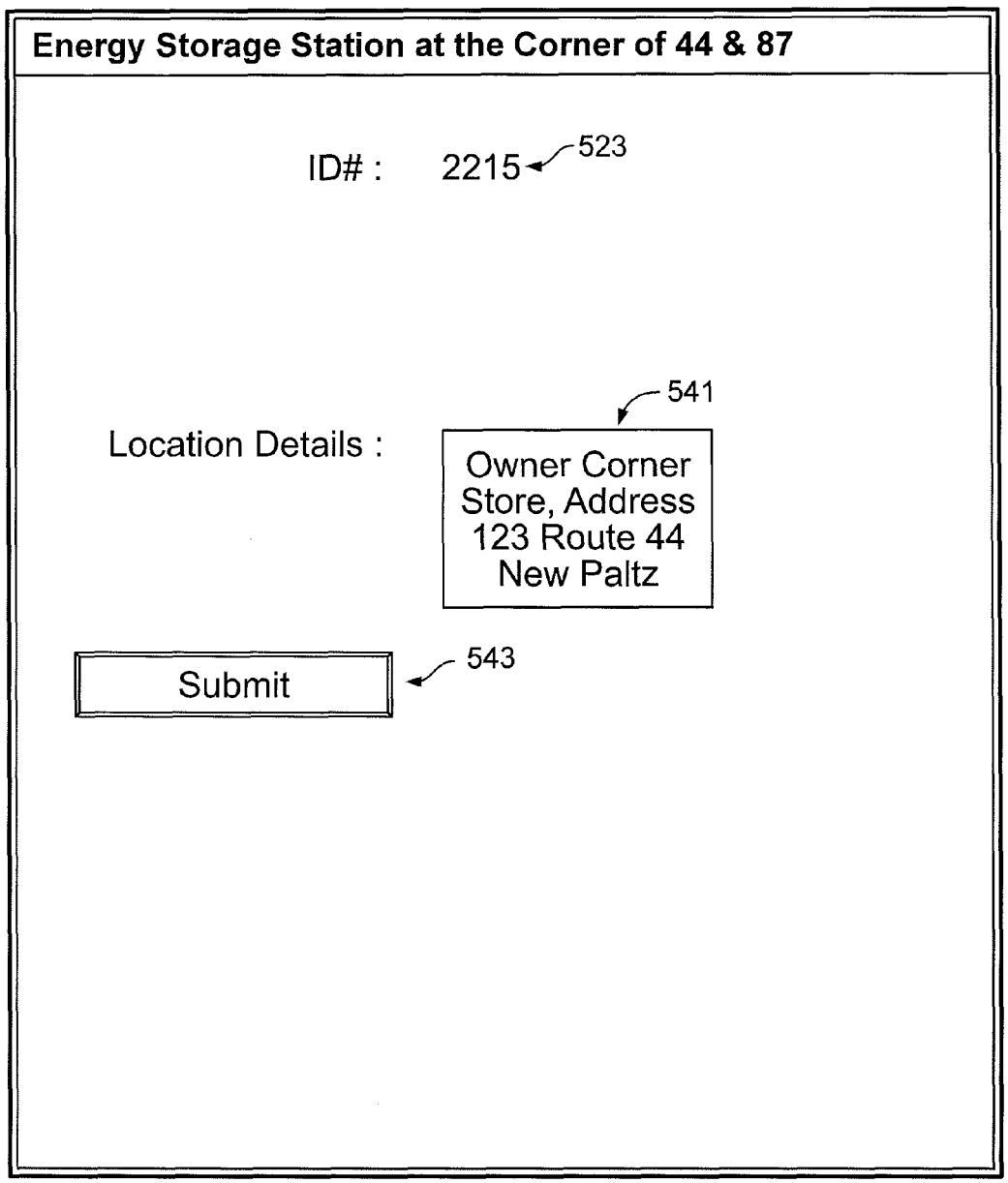
FIG. 9 shows the third GUI of the third remote device with a web page permitting input of data concerning possible participation in creating the energy storage station of FIG. 2.

Potential lessors or land providers with a third remote device thus can review map 20, and seeing potential interest, offer a location for the storage station, for example via button 538, which can result in the web page of FIG. 9. FIG. 9 shows the third GUI of the third remote device with a web page permitting input of data concerning possible participation in creating storage station 130 of FIG. 2. ID 523 can be provided along with a data entry box 540 for providing actual location data to the server operator via submission button 542.

Figure 10:
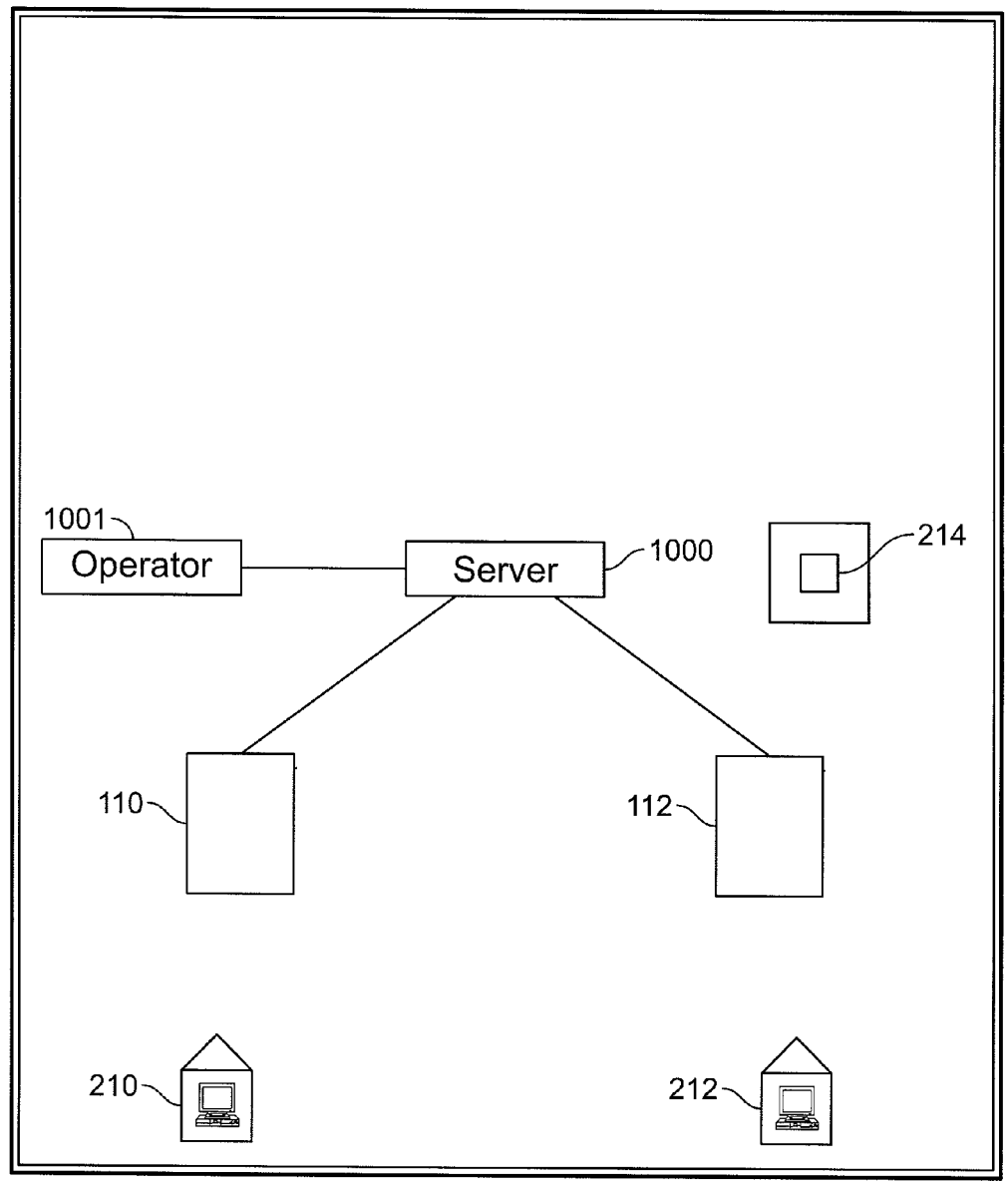
FIG. 10 shows a schematic overview of one embodiment of the system of the present invention.

FIG. 10 shows a schematic overview of one embodiment of the system of the present invention. Operator 1001 operates one or more servers 1000 interacting with remote devices 210, 212, 214. Client device 214 may be that of for example a natural gas utility, municipality or gas station owner seeking to provide a location for storage and possible payment for leasing or providing a guaranteed storage and delivery at a defined location, as described above.

The location may for example be near an existing storage facility, or in fact become embodied as a first right of refusal to energy ordinarily stored at that facility, although supply of the energy via deployed vehicles such as tanker trucks or trains to a defined site or region is also possible.

Remote devices 210, 212 may be for example home computers of and individual seeking to create an emergency energy reserve or others seeking to expand their reserve, respectively. These remote devices 210, 212 can be used as described above to create actual energy storage stations 110, 112. Timetable 1110 can be used by the operator and server 1000 to control the time and amount of energy available to each participant, for example, by permitting only those users via for example a passcode access to a storage station 110, 112 during certain times and for certain quantities and types of energy. Timetable 1110 may also be used by users to make reservations for the delivery of energy reserves.

Server 1000 may include a computer readable memory storing program instructions and a processor to execute the program instructions via the computer readable memory in order to accomplish the methods described herein. The program instructions generate the graphical user interfaces described herein. In some embodiments, a graphic user interface displays representations of a plurality of potential collective energy reserves, such as for example shown in FIGS. 2 and 15. In response to user selection of at least one representation of the potential collective energy reserves on the graphical user interface, the program instructions may generate one or more graphical user interfaces for receiving interest data including user commitments for the selected at least one representation of the potential collective energy reserves, such as for example shown in FIGS. 3, 4, 5, 16, 17a and 17b. The program instructions may compile the interest data in the computer readable memory and output commitment results when the interest data received by the at least one server indicates the level of user commitments reaches a predetermined threshold. The commitment results may be output to the operator of the server, a third party and/or the users. The operator of the server may then begin creating the corresponding collective energy reserve.

Figure 11:
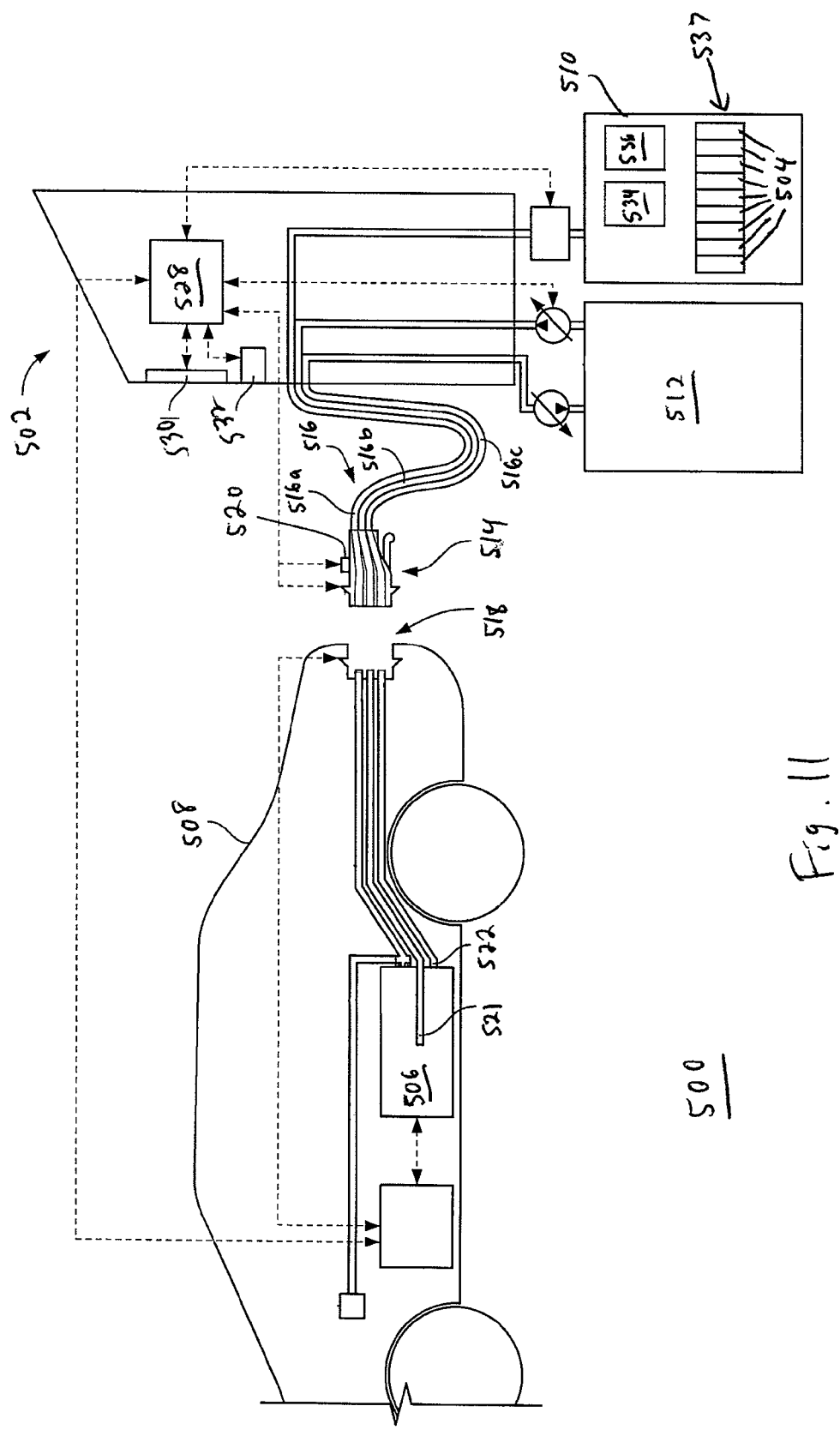
FIG. 11 shows a physical site that includes a rapid recharging electric vehicle recharging station including a collective energy reserve in the form of a battery bank including a plurality of rechargeable charging batteries.

According to additional inventive features, embodiments of the present invention may involve creating an energy reserve and an electric vehicle charging station at the same physical site, or by incorporating an energy reserve into a preexisting electric vehicle charging station. In preferred embodiments, the energy reserve includes a plurality of rechargeable charging batteries that are usable by the electric vehicle recharging station. FIG. 11 shows a physical site 500 that includes a rapid recharging electric vehicle recharging station 502 and a plurality of rechargeable charging batteries 504. Rapid recharging station 502 is for charging an onboard rechargeable electric vehicle battery 506 powering a drive train of an electric vehicle 508 according to an embodiment of the present invention. In a preferred embodiment, electric vehicle 508 is for example the electric vehicle disclosed in U.S. Publication No. 2013/0029193, the entire disclosure of which is also hereby incorporated by reference herein. For example, electric vehicle 508 may be charged according to the methods disclosed in U.S. Publication No. 2012/0043943, the entire disclosure of which is also hereby incorporated by reference herein.

Rapid charging station 502 may include an electric power supply system 510 for rapidly charging battery 506 of vehicle 508 and a temperature management system 512 for supplying heat exchange fluid to battery 506 as battery 506 is rapidly charged by electric power supply system 510. A connector 514 on an end of a supply line 516 of rapid charging station 502 is plugged into a corresponding receptacle 518 of vehicle 508. Supply line 516 includes an electrical supply line 516a, which may be a cable, coupled to electric power supply system 510 and a heat exchange fluid supply line 516b and a heat exchange fluid return line 516c, which may be hoses, coupled to temperature management system 512. After connector 514 is locked in place in receptacle 518, the driver may activate a charging/cooling actuator 520 to begin the flow of current from electric power supply system 510 and the flow of heat exchange fluid from temperature management system 512 into battery 506.

Heat exchange fluid enters battery 506 through a heat exchanger delivery line 521, passes through battery 506, exits outlets of battery 506, and enters into a heat exchange fluid return conduit 522 coupled to the outlets of battery 506. The heated heat exchange fluid then is pumped out of a heat exchange fluid outflow section in receptacle 518 into a heat exchange fluid return section in connector 514 and through return line 516c into temperature management system 512 by a return pump. The heated heat exchange fluid is cooled by temperature management system 512 for reuse.

A controller 528 may be provided for controlling the amount of charge supplied to battery 506 from electric power supply system 510 and to control the amount and/or temperature of heat exchange fluid supplied to battery 506 from temperature management system 512. Controller 528 may also be a coupled to a touchscreen 530 and a credit card receptacle 532. Along with displaying the amount owed by the vehicle owner on touchscreen 530, controller 528 may also provide information to an operator of roadside charging station 502 for charging the amount owed to the vehicle owner, for example in calculating the charge delivered and the price to be charged for the roadside recharging.

Electric power supply system 510 may include a non-renewable energy source 534, which in a preferred embodiment is a grid connected to a power plant, a renewable energy source 536, for example a solar, wind or cogen source, and bank 537 of one of more rechargeable charging batteries 504. In preferred embodiments, each rechargeable charging battery 504 is configured in the same manner as a battery 504a shown in FIG. 12 or a battery 504b shown in FIG. 13a, but with substantially more cells. Source 534, source 536 or battery bank 537 may be alternately be used to provide electricity to onboard vehicle battery 506 via electrical supply line 516a of recharging station 502. Battery bank 537 may also be used to provide electricity to onboard vehicle battery 506, in the event of failure of sources 534, 536, for example due to an emergency, or based on other conditions as determined by an electricity management system, which may be included in controller 528 or an additional controller. For example, during off peak power consumption periods, batteries 504 may be connected to one of sources 534, 536 to rapidly recharge batteries 504 as directed by controller 528 or manually. Temperature management system 512 may allow for batteries 504 to be charged at high rates by sources 534, 536 by supplying heat exchange fluid to channels 542 (FIG. 12) or channels 562 (FIGS. 13a, 13b) of batteries 504 as sources 534, 536 charge batteries 504. Controller 528 may control the rate of heat exchange fluid supply from temperature management system 512 to batteries 504, the rate of charging of batteries 504 by sources 534, 536 and whether source 534, source 536 or battery bank 537 is supplying electricity to electrically powered devices 125.

Temperature management system 512 may control the temperature of both onboard vehicle battery 506 and charging batteries 504, cooling and heating batteries 504, 506 as desired by the situation and ambient temperature conditions. Temperature management system 512 may provide heat exchange fluid to onboard electric vehicle battery 506 and to batteries 504 of bank 537. Temperature management system 512 may include a cooler that may include for example a refrigeration unit for cooling heat exchange fluid when heat exchange fluid is used to cool batteries 504, 5060 and a heater for heating heat exchange fluid when heat exchange fluid is used to heat batteries 504, 506. Temperature management system 512 may also include a heat exchanger, which allows the heat exchange fluid used to control the temperature of battery 506 to exchange heat with the heat exchange fluid used to control the temperatures of batteries 504 in bank 537.

Battery bank 537 may serve dual purposes of backup event of emergencies, and daily basis storing also for reducing peak power usage from the grid, thereby also reducing risks of capacity overload and reducing operating costs.

In brief, the application of battery bank 537 enables unique functionality and value on a cross-systems basis. Rather than backup batteries that are single purpose and solely for emergencies, the rechargeable charging batteries described herein may be applied for greater economic and national security productivity. For example, the rechargeable charging batteries may provide a daily return on investment by enabling banking an utilization of electrical energy which takes advantage of electrical re-charging at high rates during lower cost (off peak) periods and allowing electrical devices grid-independent energy via the rechargeable charging batteries during otherwise higher cost (peak) periods.

The electricity management system may include data inputs and dynamic management models in accord with a variety of considerations. For example, these parameters may include economic and operational parameters for the site, as well as more broadly for the surrounding area and region. Such decision management and decision making for example may be supported by an intelligent management system with data inputs ranging from weather and real-time operating conditions, to secure military and homeland security parameters on the needs for emergency readiness.

The advantages of such an approach may be considerable. Present practices may leave backup batteries to remain as unproductive or idle capital equipment except for emergencies, instead, according to the embodiments of the present invention the rechargeable charging batteries may be used for daily recharging of onboard electric vehicle batteries 506.

The rechargeable charging batteries provide unique characteristics because there is substantial flexibility in their operating parameters and flexibility for deployment. The system may be operated under common control, where management system, geographic/site specific logistical data and risk management models/parameters collectively or individually may be used as inputs and to help drive output decisions—i.e., in determining the optimal balance of residual charged capacity (i.e., how much to retain on-hand for emergencies in each unit or across a network of units). For example, 20% capacity may be kept charged at all times for emergency needs and 80% may be actively cycled on a daily basis. Additionally, real time information on demand frequency inputs for the user and/or for the available grid may be used to maintain and manage the best charge/discharge scenarios dynamically as needed. A dynamic model may be used to optimize such usage.

At times of greater need, such as a high national alert or pending major storm, the batteries 504 of bank 537 may be rapidly recharged and maintained at 100% charge readiness unless/until sources 534, 536 are unable to charge onboard vehicle batteries 506.

Additional advantages may include the ability to enable movable nodes to be used across a range of different volumes and capabilities. These nodes or energy banks may be comprised of moveable and non-moveable units including backup batteries, which may be batteries 504a, 504b, that may be provided to the recharging stations in the event that sources 534, 536 are down for a prolonged period of time and the energy of batteries 504 is depleted. The backup batteries of the movable nodes may be connected to recharging stations 502 in such emergency situations. For instance, sizes of such units and their weight may be configured as standard moveable units—for example packaged in standard shipping container-sized housing which is trailerable on most roadways. Other modules may be sized for "carry on" for other portability.

The movable nodes may be extensively scalable for different types and scales of applications, for example:

(A) standard single shipping container comprising 1172 cubic feet, 30,000 lbs, providing 1 MegaWatt hour;

(B) "carry on sized" valise on wheels, 50-200 lbs, providing 7-30 KiloWatt Hr; and (C) network of 100 standard single shipping containers on trailer wheels, comprising 1172 cubic feet each, 30,000 lbs each, providing cumulative 100 Megawatt hrs.

FIG. 12 shows one exemplary embodiment of a rechargeable charging battery 504a that may be used in battery bank 537. Electric vehicle battery 504a may be a modular battery including a plurality of battery cells 540 separated by a plurality of internal channels 542 in battery 504a in between cells 540. Channels 542 are preferably at least partially filled with porous compressible interconnectors 544, which act to provide an electrically-conducting interconnection between adjacent cells 540 while also allowing heat exchange fluid to be passed through internal channels 542 between cells 540 to cool cells 540 during charging. In preferred embodiments, battery 504a is the battery disclosed in U.S. Pub. No. 2009/0239130, which is hereby incorporated by reference herein, with interconnectors 544 and cells 540 being formed in the same manner as the interconnectors and the planar cell modules, respectively, disclosed in U.S. Pub. No. 2009/0239130. Cells 540 each include a positive and a negative electrode, with the positive electrodes connecting to a positive terminal 546 and the negative electrodes connecting to a negative terminal 548.

Figure 13A:
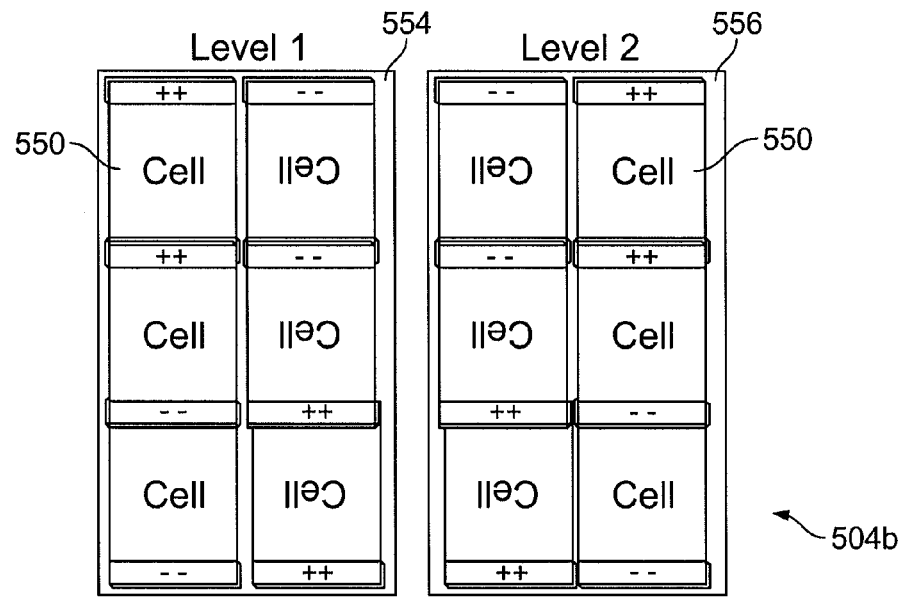
FIGS. 13a and 13b show another exemplary embodiment of a rechargeable charging battery that may be used in the battery bank.
Figure 13B:
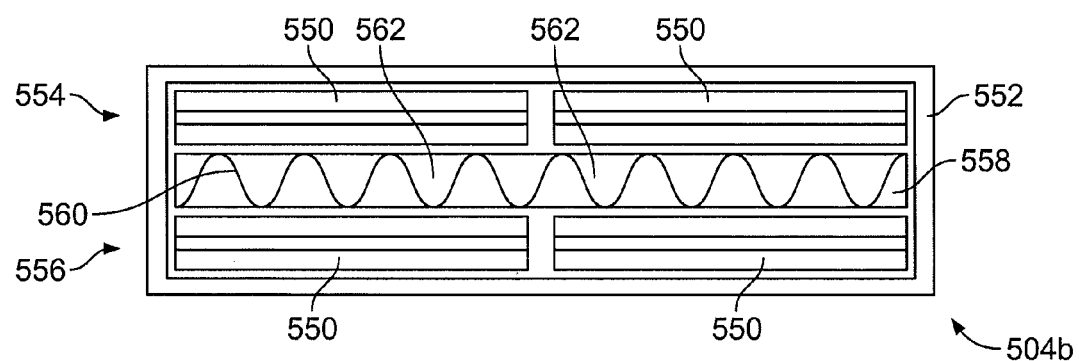

FIG. 13*a* shows another exemplary embodiment of a rechargeable charging battery 504*b* that may be used in battery bank 537. Battery 504*b* includes a plurality of cells 550 housed inside a thermally insulated enclosure 552. Enclosure 552 houses two layers 554, 556 stacked on top of each other. FIG. 13*a* shows each layer 554, 556 includes six cells 550, providing a layout for twelve cells 550 inside of enclosure 552. Alternate layouts can add additional layers (up to the total thickness that can be accommodated in the vehicle design), along with alternate series/parallel connection schemes. Batteries 504 may include up to 1,000 or more cells. FIG. 13*b* shows a cross sectional side view of battery 504*b*. A heat exchanger 558 is provided between the two layers 554, 556 for heating or cooling cells 550. In this embodiment, heat exchanger 558 is formed by attaching two flat metal plates to the opposite sides of a corrugated metal plate 560 to define a plurality of parallel channels 562 within heat exchanger 558. Heat exchange fluid from temperature management system 512 is provided through channels 562 of heat exchanger 558 to heat or cool cells 550. In embodiments including more layers of cells, more heat exchangers may be used. For example, batteries that stack n layers of cells would include n−1 heat exchanger plates, interposed between cells.

Figure 13C:
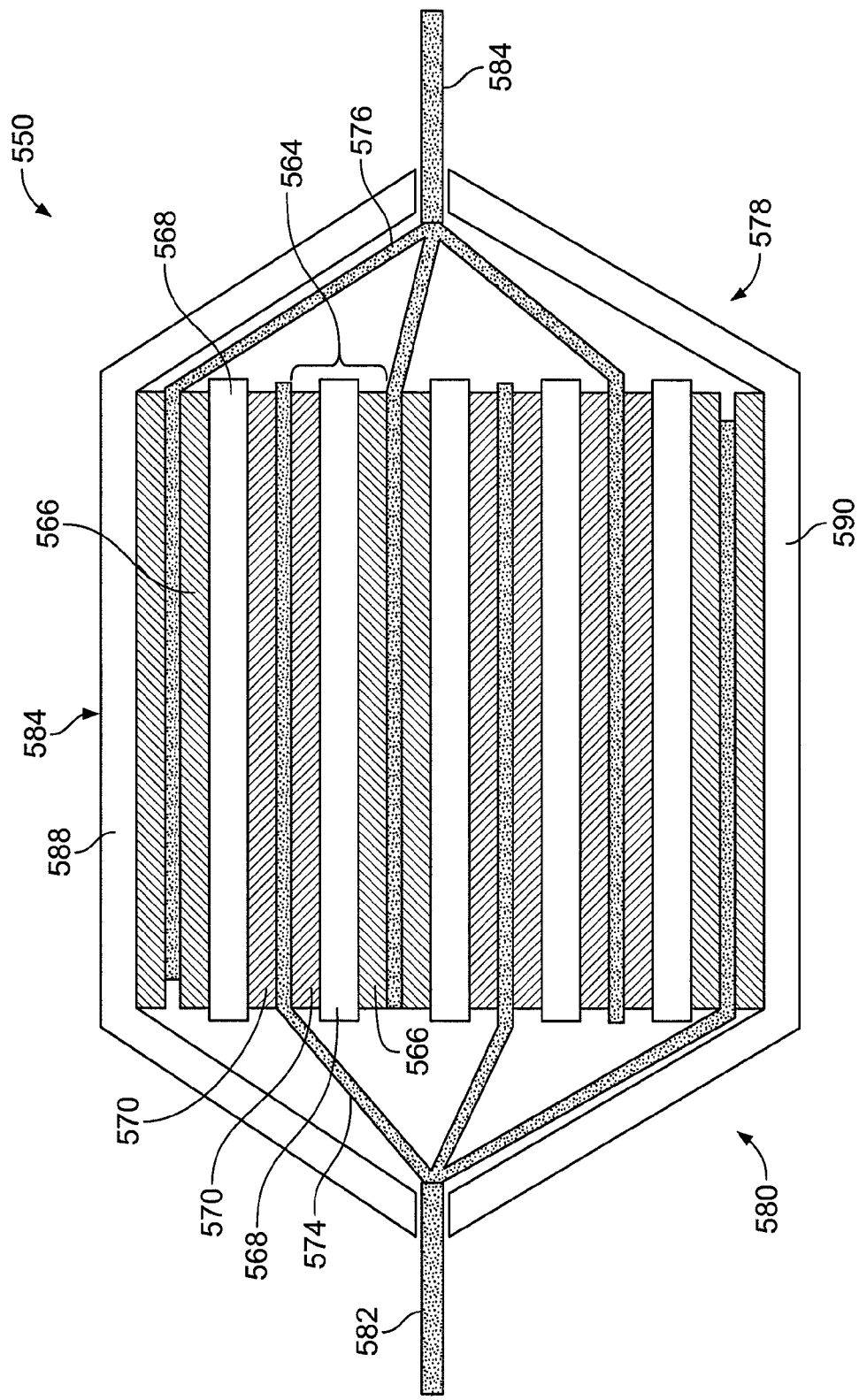
FIG. 13c shows a cross-sectional view of one of the battery cells of the battery shown in FIGS. 13a and 13b.

FIG. 13*c* shows a cross-sectional view of one of battery cells 550, which is formed by stacking plates 564 of anode material 566, solid polymer electrolyte material 568 and cathode material 570 in repeating sequences. In a preferred embodiment, battery cell 550 is a lithium sulfur cell, with lithium forming the anode material 566 and sulfur forming the cathode material 570. Polymer electrolyte material 568 may be formed of polyethylene oxide. Plates 564 may be formed by coating the polymer electrolyte material on one side of the sulfur material, then laminating the lithium material on the other side of the polymer electrolyte material. Each plate 564 may be sandwiched between an anode current collector 574, which includes anode material 566 on both sides thereof, and a cathode current collector 576, which includes cathode material 570 on both sides thereof. The current collectors of common electrodes (anode or cathode) are connected together at opposite ends of the cell, which in turn, are connected to external terminals or tabs. In other words, as shown in FIG. 13*c* anode current collectors 574 extend longitudinally away from a first longitudinal side 578 of cell 550 to connect to each other at a second longitudinal side 580 of cell 550, and cathode current collectors 576 extend longitudinally way from second longitudinal side 580 to connect to each other at first longitudinal side 578. The joined anode current collectors 574 form a tab 582 protruding at the end of longitudinal side 580 and the joined cathode current collectors 576 form a tab 584 protruding at the end of longitudinal side 578. In this embodiment, separators are not provided between adjacent sets of cathode and anode material 566, 570; however, in other embodiments separators may be included in such a manner. Each individual cell 550 includes a package 586 surrounded the energy storing parts (plates 564 and current collectors 574, 576), with tabs 582, 584 protruding longitudinally outside of package 586. In this embodiment package 586 is depicted as being a two-piece housing, including an upper piece 588 and a lower piece 590.

FIG. 14 shows an alternative embodiment with a first graphical user interface (GUI) of a first remote device with a web page 30 for receiving reserve energy purpose data and electric recharging interest data following the first location data of web page 10.

In this alternative embodiment, web page 30 permits a user of the first remote device to enter reserve energy purpose data, for example via a checklist permitting receipt of for example a mouse pointer information, where the user's interest in creating an electric vehicle recharging station and in joining or starting a collective energy reserve is identified, for example, in conjunction with a purpose for using reserve energy such as vehicle recharging. For example, web page 30 presents a user with the option of expressing interest in creating solely a vehicle recharging station, creating solely a collective energy reserve or creating a collective energy reserve together with an electric vehicle recharging station. The location data, the electric vehicle recharging station interest data and the reserve energy purpose data also may be already known by assignment at login, for example via a database.

As shown in FIG. 14, web page 30 may display reserve energy options in two different categories, for example vehicle energy and containerized energy. Vehicle energy may include gasoline, diesel, natural gas or onboard electric battery recharging energy in a form that may be directly supplied to the corresponding vehicle. Containerized energy may include gasoline, propane, natural gas or portable uninterruptible power supply (UPS) batteries in a form that is readily movable from the energy reserve site. In some preferred embodiments, portable UPS batteries may be batteries 30*a* or batteries 30*b*. In an additional embodiment the reserve energy may also be displayed based upon means of generation where options may include display of the primary source of energy generation for example grid, solar, wind, micro-generation by domestic natural gas, and micro-generation by hydrogen fuel cell.

In a preferred embodiment, one collective energy reserve is battery bank 537 and the electric vehicle recharging station is recharging station 502 shown in FIG. 11. A user selecting the box next to "Interest in Creating a New Electric Vehicle Recharging Station" in FIG. 14, but not the box next to "Vehicle Energy: Electric Recharging," may have interest in making a commitment leading to recharging station 502 being built in a particular area, but may not have any interest in making a further commitment so that recharging station 502 is built to include a battery bank 537 that can be used to charge an onboard electric vehicle battery during an emergency situation. In contrast, a user selecting the box next to "Vehicle Energy: Electric Recharging" in FIG. 14, but not the box next to "Interest in Creating a New Electric Vehicle Recharging Station," may not have an interest in making a commitment leading to the creation of a new recharging station 502, believing that there is already a sufficient number of electric vehicle recharging stations in the area, but may have an interest in converting an existing electric vehicle recharging station into a collective energy reserve by adding battery bank 537 to an existing electric vehicle recharging station that currently does not have a backup energy supply in the event of a power outage or other hardship.

Additionally, a user may select both the box next to "Interest in Creating a New Electric Vehicle Recharging Station" in FIG. 14 and the box next to "Vehicle Energy: Electric Recharging" if the user has an interest in making a commitment leading to a new recharging station 502 being built in a particular area that includes a battery bank 537 that can be used to charging an onboard electric vehicle battery during an emergency situation. For another example, a user may also select the box next to "Containerized Energy: Portable UPS Batteries" if the user has an interest in making a commitment to have access to a collective energy reserve in the form of portable UPS batteries at recharging station 502. In one embodiment, the batteries of battery bank 537 may be removable from recharging station 502 and may be used as portable UPS batteries in the event of an emergency. In another embodiment, additional batteries, which are not used to charge onboard electric vehicle batteries via recharging station 502, may be provided at the physical site of recharging station 502 for use as portable UPS batteries. The portable UPS batteries may be taken by the user to the user's residence or business as an emergency energy source. In some embodiments, portable UPS batteries, once they have been fully discharged, may be brought back to recharging station 502 for recharging.

After a user selects at least one of the options on web page 30, the selections are sent to the server and the server processes the selection and displays existing sites and/or potential sites having the selected criteria. For example, where a user has selected both "Vehicle Energy: Electric Recharging" and "Containerized Energy: Portable UPS Batteries," the server displays sites of potential and/or existing electric vehicle battery recharging stations that have the potential to provide both of these forms of reserve energy.

Figure 15:
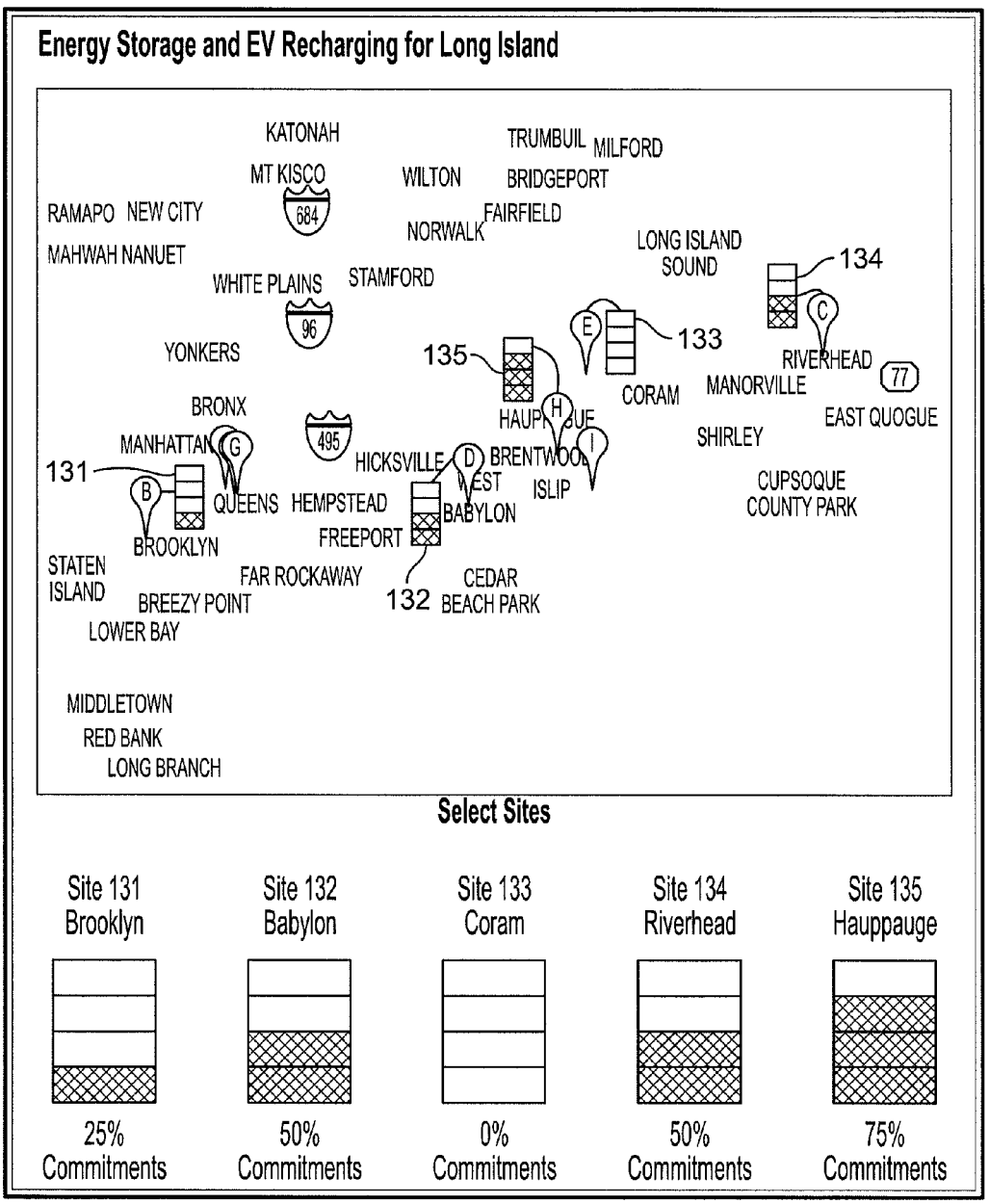
FIG. 15 show an embodiment of a graphical user interface illustrating sites of potential or existing electric vehicle recharging stations.

As shown in FIG. 15, the first reserve energy purpose data, can be received at the server, and in response to the first reserve energy purpose data and first location data 11, the server provides data concerning an existing and/or potential network of collective energy reserves aligned with vehicle recharging via for example a web page 40.

The data in FIG. 15 may include a map indicating collective energy reserves aligned with electric vehicle recharging, which are in this embodiment for example displayed as a map of existing recharging stations in Long Island. In an alternative embodiment, web page 40 permits a user to enter the user's preferred sites for a collective energy reserve, for example via permitting receipt of for example a mouse pointer information directed on a map, where the user's reserve energy purpose data and recharging interest data is identified, for example, in conjunction with a known or anticipated vehicle or a known or anticipated vehicle route. In other words, if for example a user drives or is intending to purchase a NISSAN LEAF, and has a usual everyday driving route, potential or existing vehicle recharging stations along the route that are compatible with a NISSAN LEAF are displayed as selectable icons on the map. The location and general user usage patterns may be already known by assignment at login, for example via a database or via communication with the vehicle.

FIG. 15 illustrates sites 131, 132, 133, 134, 135 of potential or existing electric vehicle recharging stations. For example, sites 131, 132, 133, 134, 135 represent an overview of an existing and possible collective energy reserve network aligned with electric vehicle recharging stations in which members of a social network or simply those accessing a website including web page 40 may be provided not only with information regarding existing energy storage stations, but also in one embodiment on becoming participants in building up the network which improves the distribution of recharging. Users may provide a commitment with respect to one of more of sites, for example by investing and providing payment data for shares in possible collective energy reserves at sites 131, 132, 133, 134 and 135. The user may select one of the icons representing sites 131, 132, 133, 134, 135, which may cause the server to generate a commitment section offering the user an opportunity to make a commitment regarding one or more of sites 131, 132, 133, 134, 135. The commitment may include an investment or other commitment regarding creating one of the potential sites as a collective energy reserve and/or an electric vehicle recharging station or regarding creating a collective energy reserve at the existing site of an existing electric vehicle recharging station. A user may enter bank information to submit the commitment to the operator of the server or may submit a payment through a third party e-commerce business, such as PAYPAL, according to terms generated by the server.

The commitment may be in the form of an actual payment, in full or in a down payment with terms of a future payment or installments, or a binding contractual agreement. The binding contractual agreement may be unconditional, or it may be conditioned on commitments to invest in the selected potential station for which the user has tendered a commitment to reach a predetermined threshold. For example, if the construction costs for a potential vehicle recharging station and/or energy reserve are estimated to be $100 k, a user can agree to invest $10 k in the potential station and/or energy reserve, with the investment being conditioned on the additional $90 k being committed by a set date.

If the commitment is for a potential vehicle recharging station, the commitment information may also include a commitment by the user to use the potential station at least a minimum number of times or to user the potential station for at least a minimum term. For example, a user may enter a binding contractual agreement to recharge the user's electric vehicle at a potential recharging station fifty times or to recharge the user's electric vehicle at a potential recharging station for four years. The user may commit to paying a predetermined fee if the user fails to meet these minimum requirements.

As shown in FIG. 15, icons may be displayed near sites 131, 132, 133, 134, 135 to illustrate a level of current commitments. In FIG. 15, the icons are also shown below the map to clearly illustrate the level of current commitments. As shown, the level of commitments in site 131, which is located in Brooklyn, is at 25% of the target level; the level of commitments in site 132, which is located in Babylon, is at 50% of the target level; the level of commitments in site 133, which is located in Corum, is at 0% of the target level; the level of commitments in site 134, which is located in Riverhead, is at 50% of the target level; and the level of commitments in site 131, which is located in Hauppague, is at 75% of the target level. In this example, the user selected both the box next to "Interest in Creating a New Electric Vehicle Recharging Station" and the box next to "Vehicle Energy: Electric Recharging" in FIG. 14. Accordingly, the level of commitments represented in the icons may be indicative of the level of commitments to create an electric vehicle energy reserve at an existing electric vehicle recharging station, the level of commitments to create a new electric vehicle recharging station or the level of commitments to create a new electric vehicle recharging station and a new electric vehicle energy reserve at the same site.

In one embodiment, the user may click on the icon, which prompts the server to generate further information regarding the level of commitments, by accessing further commitment data from the server's memory and displaying the further information to the user on the GUI. The further information may include investment information, such as details regarding ownership shares of one or more of the potential stations. The investment information may also include a share price for selected potential station and a number of shares for each selected potential station. The share price and the number of shares may be determined by the number of potential users for the selected potential station and the total estimated cost of construction for the selected potential station such that, if all shares have been purchased, all total estimated costs of construction of the station are funded. Users may then make a commitment to purchase as many or as little shares for the selected potential stations as desired. For example, for a potential station, a site may have two different levels of commitments—a first level for creating a new electric vehicle recharging station and a second level for creating a new electric vehicle energy reserve. The further information generated may include the different levels of commitments. The different levels of commitments may also be shown by two different icons, which may be coded for example by color. Existing and potential stations may also be displayed differently, for example in different colors.

Some or all of the further information may be shown on web page 40, for example in display that is activated by scrolling over or clicking on a corresponding icon. Additionally, an icon may merely represent a potential or existing site and the level(s) of commitments may be displayed by scrolling over or clicking on the corresponding icon.

In the example shown in FIG. 15, it is assumed that all of sites 131, 132, 133, 134, 135 represent potential stations and the level of commitments are the same for both creating a new electric vehicle recharging station and a new electric vehicle energy reserve at the same site. If a user wants to commit to creating the recharging station with an energy reserve at site 134, the user may select site 134 and submit interest data including a commitment as noted above by entering commitment information. The server then receives the commitment information submitted by the user and stores the commitment information with previous commitment information in a commitment record in the memory of the server. When commitments with respect to site 134 reach a predetermined threshold, the operator of the server may output the commitment results to the operator of the server, a third party and/or the users and begin constructing the recharging station with an energy reserve at site 134. In one preferred embodiment, the operator of the server may begin constructing a new recharging station 502 that includes a battery bank 537 that can be used to charge onboard electric vehicle batteries of committed users during an emergency or other hardship situation.

Similarly, if commitments to create a collective energy reserve at the site of an existing electric vehicle recharging station reach a predetermined threshold, the operator of the server may begin constructing the collective energy reserve at the site of the existing electric vehicle recharging station, which in one preferred embodiment, would include constructing a battery bank 537 at an existing recharging station 502.

FIG. 16 shows a further embodiment of the first GUI of the first remote device with a web page 50 provided by the server which may populate from the database or upon entering key data from a menu or through user entry fields to establish a user reservation for use of the collective electric vehicle charging energy reserves, via for example recharging with battery banks 537 via stations 502 during an emergency or other power supply (e.g., grid) disruption, at a prearranged range of times and sites. The user may be required to submit a reservation while making a commitment to creating the collective electric vehicle charging energy reserve. The reservation may itself be the commitment. For example, if collective electric vehicle charging energy reserve is created at a new or existing electric vehicle charging station, the user may be required to use the electric vehicle charging station one or more times per week.

In an alternative embodiment, the reservation may be preset times the user will have access to use the collective electric vehicle charging energy reserve to charge the user's vehicle in the event of an emergency or other power disruption. A user may be required to submit an investment that is commensurate with the number of preset times the user will have access to use the collective electric vehicle charging energy reserve. For example, one preset time may cost $150, two preset times may cost $250 and three preset times may cost $300. Any legal and financial obligations are assumed already signed and agreed or designated to occur at a further embodiment through the web or at the common collective energy reserve and electric vehicle recharging site.

FIG. 17*a* provides an example of a further embodiment of the first GUI enabling a user to use a mouse or interactive screen to provide further input data through the GUI by selecting further user preferences for the rate of recharge and time of recharge usage for a given location. For purposes of this example, it is assumed the data for the web page 60 is populated in part through the user's interaction with the prior web page 50 and storage of same data on the server. It is also assumed the database is prior populated with rules governing the time intervals and locations wherein a rapid recharge is available without a storage battery.

From FIG. 16, the user may be for example a nurse or fireman who works a combination of daytime and nighttime shifts. The user's usage pattern requires the user to reserve at least a minimum combination of certain peak and off-peak recharging as the user travels from the user's home in Babylon N.Y. to the user's work about 15 miles away in Haupauge (a 30 mile round trip). For this example, the user has selected a 2012 Nissan Leaf with a maximum range of 100 electric miles, and the user is assumed to be uncomfortable with less than a half capacity of recharge and so have prior established rules in the database to always fully recharge.

This example in FIG. 17*a* and web page 60 assumes that a user's selection 611 to recharge in Babylon (L1) between Midnight and 3 AM (T1) on Monday establishes a plan for Monday that does not require use of a battery to complete a high rate recharge. In this example, the user does not choose to maintain reserve energy in Babylon on Monday (L1,T1) and does not choose alternative 612.

This example assumes that a user's selection to recharge in Babylon (L1) between 3 PM and 6 PM (T2) through prior populated data produces a GUI with interactive choices whereby the user either selects a high rate recharge and use of energy storage, or goes without the high rate and storage combination. The user selects high rate 614 and specifically opts to decline the alternative of no high rate 613. For example a user with more free time might have selected a slower rate recharge where it involves a lesser cost. A user's monetary commitment may be higher if the user is making rapid recharging reservations, particularly at peak power consumption times. If for example the grid in Babylon is unable to charge off the grid between 3 PM and 6 PM (T2), the recharging station may have to recharge the user's vehicle using the energy reserve (e.g., battery bank 537). In such a situation, the user may be required to make a greater financial commitment than a user reserving rapid recharge during off peak power consumption times when the grid may be used instead of the energy reserve.

FIG. 17b shows an interactive GUI where the user data populated in through the GUI of web pages 50, 60 provide the user with feedback on cost. For example the user assumed for this embodiment could choose to participate if they are prepared to commit to a certain minimum contract duration 615, with a certain minimum cost per participant 616 by selecting the button to participate 617. A user may also try different travel assumptions or modify their existing travel plans through the GUI by selecting the alternative update button 618. Once the user accesses and provides inputs to the web pages through the server as an update, the user can review the proposed changes including 615, 616, 617 and accept the changes by once again selecting the participate button. A user who changes any of the variables of Location, Time, or Rapid recharge, and use of energy storage may be provided different terms 615, 616, 617.

Web page 60 provides an interactive field through a background database in which user designated choices for access to energy storage provide a role in populating terms of a future business contract that becomes displayed with fields including minimum contract or commitment per period and duration of commitment. Any legal and financial obligations are assumed already signed and agreed based upon user selection of an update button, or designated to occur at a further embodiment in accord with the invention as the user selects the participate button of FIG. 14.

In alternative embodiments of the present invention, software applications (e.g., mobile device "apps") may be used instead of the web pages described herein by the users to submit and receive information from the operator of the one or more servers 1000.

What is claimed is:

1. A method for creating a collective energy reserve network comprising:
   receiving, by at least one server, first location data from a first remote device indicating a location at which a user of the first remote device is requesting information regarding creating a collective energy reserve not yet existing;
   providing, by the at least one server, energy reserve data to the first remote device as a function of the first location data, the energy reserve data including representations of possible locations for creating the collective energy reserve on a graphical user interface displayed on the first remote device;
   in response to selection of one or more of the possible locations via the graphical user interface by the user, receiving, by the at least one server, interest data from the first remote device to permit creation of the collective energy reserve, the interest data including information regarding participation in creating the collective energy reserve at one or more of the possible locations; and
   creating the collective energy reserve as a function of the interest data, wherein the creating the collective energy reserve as a function of the interest data includes determining, by the at least one server, a level of participation in creating the collective energy reserve from the interest data and creating the collective energy reserve when the interest data received by the at least one server indicates the level of participation reaches a predetermined threshold, the collective energy reserve being a common bank of emergency backup power and energy from which users hold an ownership interest and defined rights.

2. The method as recited in claim 1 wherein the energy reserve data is provided as a web page, the method further comprising determining, by the at least one server, interest of the users of the first remotes device and users of additional remote devices in participating in creating the collective energy reserve from the interest data received from the first remote device and the additional remote devices and modifying, by the at least one server, the web page to indicate the interest of the users of the first remote device and the additional remote devices in participating in creating the collective energy reserve.

3. The method as recited in claim 1 further comprising:
   providing the interest data to a second remote device to generate further interest data in the collective energy reserve by determining, by the at least one server, the user of the first remote device is committed to creating the collective energy reserve and modifying, by the at least one server, the graphic user interface to include the first interest data.

4. The method as recited in claim 1 wherein the ownership interest and defined rights include access to an actual physical storage container at a specific physical location.

5. The method as recited in claim 1 wherein the ownership interest and defined rights include a guaranty providing a right of delivery or retrieval through prescribed logistics.

6. The method as recited in claim 5 wherein the prescribed logistics include arrival of a reserved amount of energy to a predetermined site or area that fulfills rights to access a reserved quantity and form of energy at a time period and area of need.

7. A method for creating a collective energy reserve and electric vehicle recharging network comprising:
   receiving, by at least one server, first location data from a first remote device indicating a location at which a user of the first remote device is requesting information regarding creating a collective energy reserve and an electric vehicle recharging station not yet existing;
   providing, by the at least one server, energy data to the first remote device as a function of the first location data, the energy data including representations of possible locations for creating the collective energy reserve and the electric vehicle recharging station on a graphical user interface displayed on the first remote device;
   in response to selection of one or more of the possible locations via the graphical user interface by the user, receiving interest data, by the at least one server, from the first remote device to permit creation of at least one of the collective energy reserve and the electric vehicle recharging station, the interest data including information regarding participation in creating at least one of the collective energy reserve and the electric vehicle recharging station at one or more of the possible locations; and
   creating at least one of the collective energy reserve and the electric vehicle recharging station as a function of the interest data, the creating the at least one of the collective energy reserve and the electric vehicle recharging station as a function of the interest data including determining, by the at least one server, a level of participation in creating the at least one of the collective energy reserve and the electric vehicle recharging station from the interest data and creating the at least one of the collective energy reserve and the electric vehicle recharging station when the interest data received by the at least one server indicates the level of participation reaches a predetermined threshold, the collective energy reserve being a common bank of emergency backup power and energy from which users hold an ownership interest and defined rights.

8. The method as recited in claim 7 wherein creating step includes creating both the collective energy reserve and the electric vehicle recharging station when the interest data indicates the level of participation in creating the collective energy reserve reaches the predetermined threshold and the level of participation in creating the electric vehicle recharging station reaches the predetermined threshold.

9. The method as recited in claim 8 wherein creating step includes creating the collective energy reserve and the electric vehicle recharging station at a same physical site.

10. The method as recited in claim 9 wherein the collective energy reserve includes a plurality of rechargeable charging batteries that are usable by the electric vehicle recharging station.

11. The method as recited in claim 7 wherein creating step includes creating solely the collective energy reserve when the interest data indicates the level of participation in creating the collective energy reserve reaches the predetermined threshold and the level of participation in creating the electric vehicle recharging station does not reach the predetermined threshold.

12. The method as recited in claim 7 wherein creating step includes creating solely the electric vehicle recharging station when the interest data indicates the level of participation in creating the electric vehicle recharging station reaches the predetermined threshold and the level of participation in creating the collective energy reserve does not reach the predetermined threshold.

13. The method as recited in claim 7 wherein the creating step includes creating the collective energy reserve at an existing electric vehicle recharging station such that the collective energy reserve is usable by the existing electric vehicle recharging station to charge onboard electric vehicle batteries.

14. A method for creating a reserve bank of batteries for recharging electrical vehicles during emergencies when the electric grid is unavailable comprising:

receiving, by at least one server, first location data from a first remote device indicating a location at which a user of the first remote device is requesting information regarding creating a collective bank of batteries not yet existing, the collective bank of batteries configured for recharging an electric vehicle battery during emergencies when the electric grid is unavailable;

providing, by the at least one server, battery bank data to the first remote device as a function of the first location data, the battery bank data including representations of possible locations for creating the collective bank of batteries on a map of a graphical user interface displayed on the first remote device;

in response to selection of one or more of the possible locations via the graphical user interface by the user, receiving, by the at least one server, a financial commitment from the first remote device to permit creation of the bank of batteries at one or more of the possible locations; and constructing the collective bank of batteries at a physical site corresponding to one or more of the possible locations when a level of financial commitments from users reach a predetermined threshold;

providing all users making financial commitments with respect to the collective bank of batteries with an ownership interest and defined rights in the constructed collective bank of batteries.

\* \* \* \* \*